United States Patent
Nakatsugawa et al.

(10) Patent No.: US 11,625,267 B2
(45) Date of Patent: Apr. 11, 2023

(54) INFORMATION PROCESSING APPARATUS AND INFORMATION PROCESSING METHOD FOR CHANGING CONTENTS OF A PROCESS TO BE PERFORMED AFTER AN INTERRUPT IS DETECTED

(71) Applicant: FeliCa Networks, Inc., Tokyo (JP)

(72) Inventors: Yasumasa Nakatsugawa, Kanagawa (JP); Seiji Kawamura, Tokyo (JP); Naofumi Hanaki, Kanagawa (JP)

(73) Assignee: FELICA NETWORKS, INC., Tokyo (JP)

( * ) Notice: Subject to any disclaimer, the term of this patent is extended or adjusted under 35 U.S.C. 154(b) by 259 days.

(21) Appl. No.: 16/633,897

(22) PCT Filed: Jun. 18, 2018

(86) PCT No.: PCT/JP2018/023108
§ 371 (c)(1),
(2) Date: Jan. 24, 2020

(87) PCT Pub. No.: WO2019/026442
PCT Pub. Date: Feb. 7, 2019

(65) Prior Publication Data
US 2021/0149712 A1    May 20, 2021

(30) Foreign Application Priority Data
Aug. 2, 2017 (JP) .............................. JP2017-149655

(51) Int. Cl.
*G06F 9/48* (2006.01)

(52) U.S. Cl.
CPC .......... *G06F 9/4812* (2013.01); *G06F 9/4881* (2013.01); *G06F 2209/481* (2013.01)

(58) Field of Classification Search
None
See application file for complete search history.

(56) References Cited

U.S. PATENT DOCUMENTS 5,594,869 A * 1/1997 Hawe .................. H04L 63/0485
709/236
5,850,507 A * 12/1998 Ngai .................... G06F 11/1474
714/E11.131

(Continued)

FOREIGN PATENT DOCUMENTS

JP    2016113968 A    6/2016

OTHER PUBLICATIONS

Abdel Aziz Farrag et al: "Using semantic knowledge of transactions to increase concurrency", ACM Transactions on Database Systems, ACM, New York, NY, US, vol. 14, No. 4, Dec. 1, 1989 pp. 503-525.

*Primary Examiner* — Adam Lee
(74) *Attorney, Agent, or Firm* — Paratus Law Group, PLLC

(57) ABSTRACT

There is provided an information processing apparatus including a processing unit that performs a series of processes with an external device, and a detection unit that detects an interrupt of a process other than the series of processes after the series of processes is started, in which the processing unit changes contents of a process to be performed after the interrupt is detected on the basis of a detection state of the interrupt.

17 Claims, 8 Drawing Sheets

(56) References Cited

U.S. PATENT DOCUMENTS

| | | | | |
|---|---|---|---|---|
| 5,931,936 A * | 8/1999 | Chung | ............... | G06F 9/4812 710/263 |
| 6,430,662 B1 * | 8/2002 | Hurich | ............... | G11C 16/105 711/162 |
| 6,865,636 B1 * | 3/2005 | Hober | ............... | G06F 9/3851 710/48 |
| 6,961,865 B1 * | 11/2005 | Ganesh | ............... | G06F 11/1474 714/E11.131 |
| 7,103,597 B2 | 9/2006 | McGoveran | | |
| 8,213,915 B1 * | 7/2012 | Upadhyay | ............... | H04L 67/02 455/414.3 |
| 9,015,718 B1 * | 4/2015 | Zhang | ............... | G06F 9/5022 718/100 |
| 2002/0066003 A1 * | 5/2002 | Nevill | ............... | G06F 9/30174 712/E9.055 |
| 2002/0116563 A1 * | 8/2002 | Lever | ............... | G06F 13/26 710/260 |
| 2004/0068501 A1 | 4/2004 | McGoveran | | |
| 2005/0166184 A1 * | 7/2005 | Takao | ............... | G06F 9/451 717/117 |
| 2006/0037020 A1 * | 2/2006 | Accapadi | ............... | G06F 9/4812 718/102 |
| 2006/0234706 A1 * | 10/2006 | Wallentin | ............... | H04W 76/32 455/524 |
| 2006/0271918 A1 * | 11/2006 | Abe | ............... | G06F 11/1438 714/E11.132 |
| 2006/0282400 A1 * | 12/2006 | Kalavacharla | ............... | G06F 9/466 |
| 2008/0046621 A1 * | 2/2008 | Okino | ............... | G06F 9/4812 710/260 |
| 2009/0097064 A1 * | 4/2009 | Tominaga | ............... | H04N 1/32 358/1.15 |
| 2009/0150891 A1 * | 6/2009 | Matsa | ............... | G06F 9/4881 718/103 |
| 2009/0271796 A1 * | 10/2009 | Kojima | ............... | G06F 9/4881 718/107 |
| 2010/0017655 A1 * | 1/2010 | Gooding | ............... | G06F 11/1482 714/E11.03 |
| 2010/0202203 A1 * | 8/2010 | Choi | ............... | G11C 16/3418 365/185.25 |
| 2010/0299472 A1 * | 11/2010 | Tanaka | ............... | G06F 9/4856 718/100 |
| 2010/0306778 A1 * | 12/2010 | Wolf | ............... | G06F 9/485 718/103 |
| 2011/0093865 A1 * | 4/2011 | Dawson | ............... | G06F 9/54 719/313 |
| 2011/0296148 A1 * | 12/2011 | Cain, III | ............... | G06F 9/467 712/228 |
| 2012/0032598 A1 * | 2/2012 | Shioiri | ............... | G03B 21/2033 315/121 |
| 2012/0131375 A1 * | 5/2012 | Adda | ............... | G06F 11/1402 714/2 |
| 2012/0203986 A1 * | 8/2012 | Strasser | ............... | G06F 3/0688 711/158 |
| 2012/0246501 A1 * | 9/2012 | Haruki | ............... | G06F 1/324 713/323 |
| 2013/0138850 A1 * | 5/2013 | Yamashita | ............... | G06F 13/24 710/267 |
| 2014/0156871 A1 * | 6/2014 | Chandrasekaran | ... | G06F 13/102 710/5 |
| 2016/0041882 A1 * | 2/2016 | Kruse | ............... | G06F 11/0727 714/16 |
| 2018/0032282 A1 * | 2/2018 | Hahn | ............... | G06F 3/0604 |
| 2018/0095795 A1 * | 4/2018 | Hebert | ............... | G06F 9/4881 |
| 2018/0097720 A1 * | 4/2018 | Jaffer | ............... | H04L 45/70 |
| 2018/0349253 A1 * | 12/2018 | Woodward | ............... | G06F 11/3664 |

* cited by examiner

INFORMATION PROCESSING APPARATUS AND INFORMATION PROCESSING METHOD FOR CHANGING CONTENTS OF A PROCESS TO BE PERFORMED AFTER AN INTERRUPT IS DETECTED

CROSS REFERENCE TO PRIOR APPLICATION

This application is a National Stage Patent Application of PCT International Patent Application No. PCT/JP2018/023108 (filed on Jun. 18, 2018) under 35 U.S.C. § 371, which claims priority to Japanese Patent Application No. 2017-149655 (filed on Aug. 2, 2017), which are all hereby incorporated by reference in their entirety.

TECHNICAL FIELD

The present disclosure relates to an information processing apparatus and a method for processing information.

BACKGROUND ART

There has been developed a technique of shortening a time from when a predetermined condition is satisfied to when charging of an electronic value is complete. Examples of the technique include the technique disclosed in Patent Document 1 set out below.

CITATION LIST

Patent Document

Patent Document 1: International Publication No. 2014/033939

SUMMARY OF THE INVENTION

Problems to be Solved by the Invention

In a case where information (data) is updated or the like by communication being performed between one device and another device, multiple processes involving communication can be performed between the devices as a series of processes. In a case where a series of processes is performed between one device and another device, a process other than the series of processes may interrupt between one process and another process included in the series of processes.

Examples of a method of suppressing an interrupt of a process other than the series of processes described above include "maintaining a session during the series of processes using a device performing the series of processes".

Here, in a case where a series of processes is performed between one device and another device, a relay component that relays communication may intervene in communication between the devices. Examples of the relay component described above include one or both of "a device other than one device such as a relay server and another device" and "software to be executed in each of one device and another device, such as an application and a driver". Examples of the application described above include a firmware, such as mobile FeliCa that can be used as electronic money and a transportation ticket, and Java Applet on a Java Card OS compliant with Global Platform.

In a case where a relay component intervenes in communication between one device and another device, the relay component also needs to maintain a session to suppress an interrupt of a process other than a series of processes due to the session. Furthermore, in a case where the relay component needs to maintain the session, for example, there are the following disadvantages compared with the case where the relay component does not maintain the session.

A relay server (exemplary relay component) needs to maintain a state for maintaining a session in a session continuation section, whereby the number of clients that can be processed by the relay server at a time decreases.

The number of clients that can be processed by the relay server at a time decreases, whereby it is necessary to increase the number of relay servers to increase the number of clients.

Implementation of software (another example of relay component), such as an application and a driver, becomes complex.

The present disclosure proposes a novel and improved information processing apparatus and a method for processing information capable of performing a series of processes between devices without maintaining a session.

Solutions to Problems

According to the present disclosure, there is provided an information processing apparatus including a processing unit that performs a series of processes with an external device, and a detection unit that detects an interrupt of a process other than the series of processes after the series of processes is started, in which the processing unit changes contents of a process to be performed after the interrupt is detected on the basis of a detection state of the interrupt.

Furthermore, according to the present disclosure, there is provided an information processing apparatus including a processing unit that performs a series of processes with an external device, in which the processing unit causes a start command for starting detection of an interrupt of a process other than the series of processes after the series of processes is started to be transmitted to the external device.

Furthermore, according to the present disclosure, there is provided a method for processing information to be executed by an information processing apparatus, the method including a step of performing a series of processes with an external device, and a step of detecting an interrupt of a process other than the series of processes with respect to the series of processes that has been started, in which in the step of performing the series of processes, contents of a process to be performed after the interrupt is detected are changed on the basis of a detection state of the interrupt.

Effects of the Invention

According to the present disclosure, a series of processes between devices can be performed without maintaining a session.

Note that the effect described above is not necessarily limited, and any of the effects described in the present specification or another effect that can be understood from the present specification may be exerted in addition to the effect described above or instead of the effect described above.

MODE FOR CARRYING OUT THE INVENTION

Hereinafter, a preferred embodiment of the present disclosure will be described in detail with reference to the accompanying drawings. Note that, in the present specification and the drawings, constituent elements having substantially the same functional configuration will be denoted by the same reference signs, and duplicate descriptions thereof will be omitted.

Furthermore, descriptions will be given in the following order.

1. Information processing system according to the present embodiment, and Method for processing information according to the present embodiment 2. Program according to the present embodiment (Information Processing System According to the Present Embodiment, and Method for Processing Information According to the Present Embodiment)

Hereinafter, an example of the information processing system according to the present embodiment will be described, and then the method for processing information according to the present embodiment will be described using an exemplary case where it is applied to the information processing system according to the present embodiment.

[1] Information Processing System According to the Present Embodiment

Figure 1:
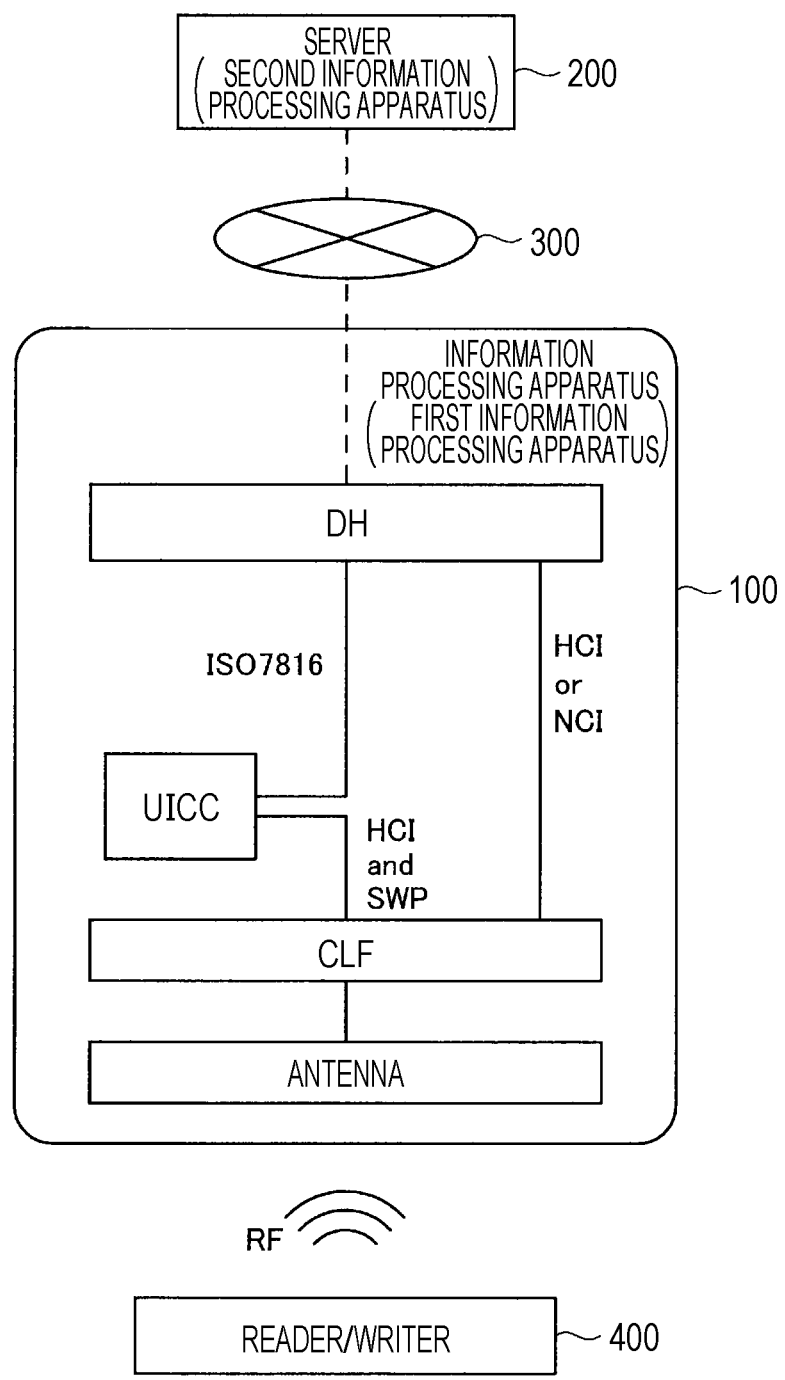
FIG. 1 is an explanatory diagram illustrating an exemplary configuration of an information processing system according to the present embodiment.

FIG. 1 is an explanatory diagram illustrating an exemplary configuration of an information processing system 1000 according to the present embodiment. The information processing system 1000 includes, for example, an information processing apparatus 100 (first information processing apparatus), and a server 200 (second information processing apparatus).

The information processing apparatus 100 and the server 200 communicate with each other via a network 300 (or directly), for example.

Examples of the network 300 include a wired network such as a local area network (LAN) and a wide area network (WAN), a wireless network such as a wireless local area network (WLAN), and the Internet using a communication protocol such as a transmission control protocol/Internet protocol (TCP/IP).

Furthermore, in a case where the information processing apparatus 100 and the server 200 communicate with each other via the network 300, a relay server (exemplary relay component (not illustrated)) that relays communication may intervene in the communication between the information processing apparatus 100 and the server 200.

Furthermore, FIG. 1 also illustrates a reader/writer 400 capable of performing non-contact communication with the information processing apparatus 100. In a case where the information processing apparatus 100 and the server 200 communicate with each other and perform a series of processes, the reader/writer 400 corresponds to an exemplary external device for the information processing apparatus 100 and the server 200.

Examples of the non-contact communication according to the present embodiment include near field communication (NFC) defined in ISO/IEC 18092. In NFC, communication is performed using a magnetic field (carrier wave) having a predetermined frequency, such as 13.56 [MHz].

Note that the information processing system according to the present embodiment is not limited to the example illustrated in FIG. 1.

For example, in the information processing system according to the present embodiment, the information processing apparatus 100 and the server 200 may be able to communicate with each other via the reader/writer 400.

Furthermore, in the information processing system according to the present embodiment, a configuration not including the reader/writer 400 illustrated in FIG. 1 can be adopted, for example.

Furthermore, the information processing system according to the present embodiment may include a device capable of communicating with the information processing apparatus 100 using an optional communication scheme, for example. The device capable of communicating with the information processing apparatus 100 using an optional communication scheme corresponds to another example of the external device for the information processing apparatus 100 and the server 200.

Furthermore, the information processing system according to the present embodiment may include a plurality of the information processing apparatuses 100.

In a case where the information processing system according to the present embodiment includes the plurality of information processing apparatuses 100, the server 200 individually (independently) communicates with each of the plurality of information processing apparatuses 100, for example.

Hereinafter, an exemplary configuration of each of the information processing apparatus 100 (first information processing apparatus) and the server 200 (second information processing apparatus) will be described using the information processing apparatus 100 and the server 200 included in the information processing system 1000 illustrated in FIG. 1 as an example.

[1-1] Information Processing Apparatus 100 (First Information Processing Apparatus)

Figure 2:
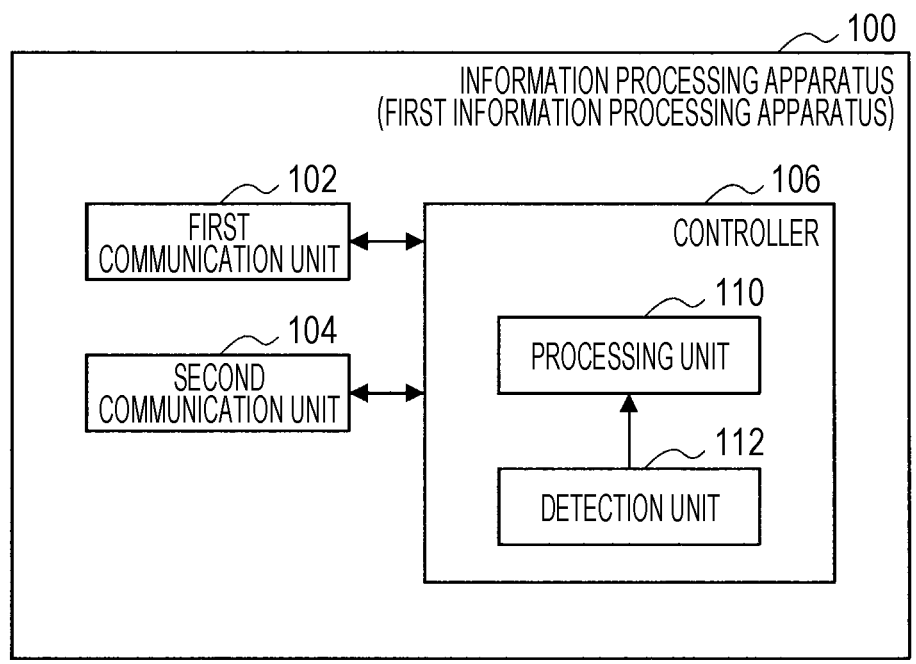
FIG. 2 is a block diagram illustrating an exemplary configuration of an information processing apparatus (first information processing apparatus) according to the present embodiment.

FIG. 2 is a block diagram illustrating an exemplary configuration of the information processing apparatus 100 (first information processing apparatus) according to the present embodiment. The information processing apparatus 100 includes, for example, a first communication unit 102, a second communication unit 104, and a controller 106.

Furthermore, the information processing apparatus 100 may include, for example, a read-only memory (ROM) (not illustrated), a random access memory (RAM) (not illustrated), a storage (not illustrated), an operation unit (not illustrated) that can be operated by a user of the information processing apparatus 100, a display (not illustrated) that displays various screens on a display screen, and the like. The information processing apparatus 100 connects the respective components using, for example, a bus serving as a data transmission path.

The ROM (not illustrated) stores control data, such as programs and operation parameters to be used by the controller 106. The RAM (not illustrated) temporarily stores programs and the like executed by the controller 106.

The storage (not illustrated) is a storage means included in the information processing apparatus 100, which stores various data, such as data related to a method for processing information applied to the information processing apparatus 100 such as interrupt detection information (to be described later), and various applications. Here, examples of the storage (not illustrated) include a magnetic recording medium such as a hard disk, and a non-volatile memory such as a flash memory. Furthermore, the storage (not illustrated) may be detachable from the information processing apparatus 100.

Examples of the operation unit (not illustrated) include a button, a direction key, a rotary selector such as a jog dial, and a combination thereof. Furthermore, examples of the display (not illustrated) include a liquid crystal display and an organic EL display (also referred to as an organic light emitting diode (OLED) display).

[Exemplary Hardware Configuration of the Information Processing Apparatus 100]

As illustrated in FIG. 1, for example, the information processing apparatus 100 includes a universal integrated circuit card (UICC), a contactless front end (CLF), an antenna, and a device host (DH). Furthermore, the information processing apparatus 100 is driven by, for example, power supplied from an internal power supply included in the information processing apparatus 100, such as a battery, power supplied from a connected external power supply, or the like.

FIG. 1 illustrates an exemplary case where the UICC and the CLF communicate with each other via communication interfaces called a host controller interface (HCI) and a single wire protocol (SWP), and the UICC and the DH communicate with each other via a communication interface based on, for example, ISO 7816 standard. That is, FIG. 1 illustrates an exemplary case where the UICC communicates with each of the CLF and the DH using two different communication paths.

Furthermore, FIG. 1 illustrates an exemplary case where the CLF and the DH communicate with each other via the HCI or an NFC controller interface (NCI).

Note that the communication interfaces between the UICC, the CLF, and the DH are not limited to the examples described above. For example, the UICC and the CLF may communicate with each other via a communication interface called a dual wire protocol (DWP) instead of the SWP illustrated in FIG. 1. For example, the DH and the UICC can indirectly perform contact communication via another component, such as DH-CLF-UICC.

The UICC functions to lead a process associated with a method for processing information according to the present embodiment in the information processing apparatus 100, for example. The process associated with the method for processing information in the information processing apparatus 100 will be described later.

The UICC includes, for example, one or more processors including an operational circuit such as a micro processing unit (MPU), and the processors lead the process associated with the method for processing information in the information processing apparatus 100 to be described later.

Furthermore, the UICC may include a recording medium capable of storing various data, such as an electronic value (data having a value corresponding to currency or similar to currency), an application, and the like. The recording medium included in the UICC has tamper resistance, for example. That is, the UICC may be a secure element.

For example, information stored in the recording medium included in the UICC can be updated by communication between the information processing apparatus 100 and the server 200.

The UICC communicates with the server 200 on the basis of communication via the DH, for example. Note that, as described above, in the information processing system according to the present embodiment, the UICC may communicate with the reader/writer 400 on the basis of non-contact communication via the CLF and the antenna, and may communicate with the server 200 via the reader/writer 400, for example. Furthermore, the UICC and the server 200 can communicate with each other via a contact reader/writer (not illustrated) that performs contact communication with the UICC, for example.

Note that the component capable of leading the process associated with the method for processing information in the information processing apparatus 100 to be described later is not limited to the UICC. For example, the component capable of leading the process associated with the method for processing information in the information processing apparatus 100 to be described later may be a "subscriber identity module (SIM)", "eUICC" (case where the UICC illustrated in FIG. 1 is not detachable), "eSE" (case where the UICC illustrated in FIG. 1 is not detachable and does not store information necessary for connection to a general public wireless line), or the like. Furthermore, the component capable of leading the process associated with the method for processing information in the information processing apparatus 100 to be described later may be a processor (to be described later) included in the DH.

The CLF corresponds to a non-contact communication device capable of performing non-contact communication with an external device, and is connected to an antenna for non-contact communication. Note that the antenna may be included in the CLF.

For example, the CLF receives carrier waves using a connected antenna, demodulates the signals, and performs load modulation, thereby responding to the external device via the antenna.

The DH includes, for example, one or more processors including an operational circuit such as an MPU. The processor included in the DH executes middleware or applications to perform various kinds of processing. As described above, the processor included in the DH may lead the process associated with the method for processing information in the information processing apparatus 100 to be described later. The processor included in the DH corresponds to an external processor for the UICC.

Furthermore, the DH includes, for example, a communication device, and communicates with an external device such as the server 200 using the communication device. Note that the DH can communicate with the external device such as the server 200 using an external communication device connected thereto.

Here, examples of the communication device included in the DH or the communication device to be connected to the DH include a communication antenna and a radio frequency (RF) circuit (wireless communication), an IEEE 802.15.1 port and a transmission/reception circuit (wireless communication), an IEEE 802.11 port and a transmission/reception circuit (wireless communication), and a LAN terminal and a transmission/reception circuit (wired communication). Furthermore, the communication device included in the DH or the communication device to be connected to the DH may have a configuration supporting a communication scheme corresponding to that of the network 300.

The information processing apparatus 100 has, for example, the hardware configuration illustrated in FIG. 1.

Note that the hardware configuration of the information processing apparatus according to the present embodiment is not limited to the configuration illustrated in FIG. 1.

For example, the UICC and the CLF illustrated in FIG. 1 may be configured by a single piece of hardware. Furthermore, in a case where the UICC is connected to an external non-contact device having the function similar to that of the CLF, for example, the information processing apparatus according to the present embodiment may not include the CLF illustrated in FIG. 1.

Furthermore, although the configuration capable of communicating with an external device other than the server 200 on the basis of the NFC has been illustrated in FIG. 1, the information processing apparatus according to the present embodiment may have a configuration capable of communicating with an external device other than the server 200 using an optional communication scheme other than the NFC.

Furthermore, the information processing apparatus according to the present embodiment can take a configuration corresponding to exemplary application of the information processing apparatus 100 (first information processing apparatus) to be described later, for example.

Furthermore, the information processing apparatus according to the present embodiment may have a hardware configuration (including variations) similar to that of the server 200 to be described later, for example. In a case where, for example, the information processing apparatus according to the present embodiment has a hardware configuration (including variations) similar to that of the server 200 to be described later, the process associated with the method for processing information in the information processing apparatus 100 to be described later is led by a processor (e.g., MPU 250 to be described later) included in the information processing apparatus according to the present embodiment, for example.

Hereinafter, an exemplary case where the information processing apparatus according to the present embodiment is the information processing apparatus 100 having the hardware configuration illustrated in FIG. 1 will be described.

With reference to FIG. 2 again, an exemplary configuration of the information processing apparatus 100 will be described. The first communication unit 102 is one communication means included in the information processing apparatus 100, which communicates with, via the network 300 (or directly), an external device, such as the server 200 and a relay server (not illustrated), by wire or wirelessly. Furthermore, communication of the first communication unit 102 is controlled by, for example, the controller 106.

Here, although examples of the first communication unit 102 include a communication antenna, an RF circuit, a LAN terminal, and a transmission/reception circuit, the configuration of the first communication unit 102 is not limited to the above. For example, the first communication unit 102 can take a configuration supporting any standard capable of performing communication, such as a universal serial bus (USB) terminal and a transmission/reception circuit, or can take any configuration capable of communicating with an external device via the network 300. Furthermore, the first communication unit 102 may have a configuration capable of communicating with one or more external devices using a plurality of communication schemes.

The second communication unit 104 is another communication means included in the information processing apparatus 100. Communication of the second communication unit 104 is controlled by, for example, the controller 106.

Although examples of the second communication unit 104 include the CLF and the UICC illustrated in FIG. 1, the configuration of the second communication unit 104 is not limited to the above. For example, the second communication unit 104 may have any configuration supporting a communication scheme different from that of the first communication unit 102.

The controller 106 functions to control the entire information processing apparatus 100. Furthermore, the controller 106 includes, for example, a processing unit 110 and a detection unit 112, and functions to lead the process associated with the method for processing information in the information processing apparatus 100 to be described later.

Examples of the controller 106 include one or more processors, such as one or both of the processor included in the UICC and the processor included in the DH.

The processing unit 110 functions to perform, for example, an execution process (to be described later) associated with the method for processing information according to the present embodiment, and performs a series of processes with an external device, such as the server 200. Examples of a process included in the series of processes according to the present embodiment include any process performed between devices, such as a process related to mutual authentication, a process related to information readout, and a process related to information writing (or updating). Note that the series of processes according to the present embodiment may include a process performed by a single device.

The detection unit 112 functions to perform, for example, a detection process (to be described later) associated with the method for processing information according to the present embodiment, and detects an interrupt of "a process other than the series of processes with respect to the started series of processes".

The controller 106 includes, for example, the processing unit 110 and the detection unit 112, thereby functioning to lead the process associated with the method for processing information in the information processing apparatus 100. An example of the process associated with the method for processing information in the information processing apparatus 100 will be described later.

Note that the configuration of the information processing apparatus (first information processing apparatus) according to the present embodiment is not limited to the configuration illustrated in FIG. 2.

For example, the information processing apparatus according to the present embodiment can include one or both of the processing unit 110 and the detection unit 112 illustrated in FIG. 2 separately from the controller 106 (e.g., implement one or both of them with another processing circuit).

Furthermore, the configuration of the information processing apparatus according to the present embodiment is not limited to the configuration illustrated in FIG. 2, and a configuration corresponding to how the process associated with the method for processing information in the information processing apparatus 100 to be described later is separated can be adopted.

Furthermore, in a case where communication is performed with an external device via an external communication device having a function and a configuration similar to those of the first communication unit 102, for example, the information processing apparatus according to the present embodiment may not include the first communication unit 102.

Furthermore, the information processing apparatus according to the present embodiment may not include the second communication unit 104, for example.

[1-2] Server 200 (Second Information Processing Apparatus)

Figure 3:
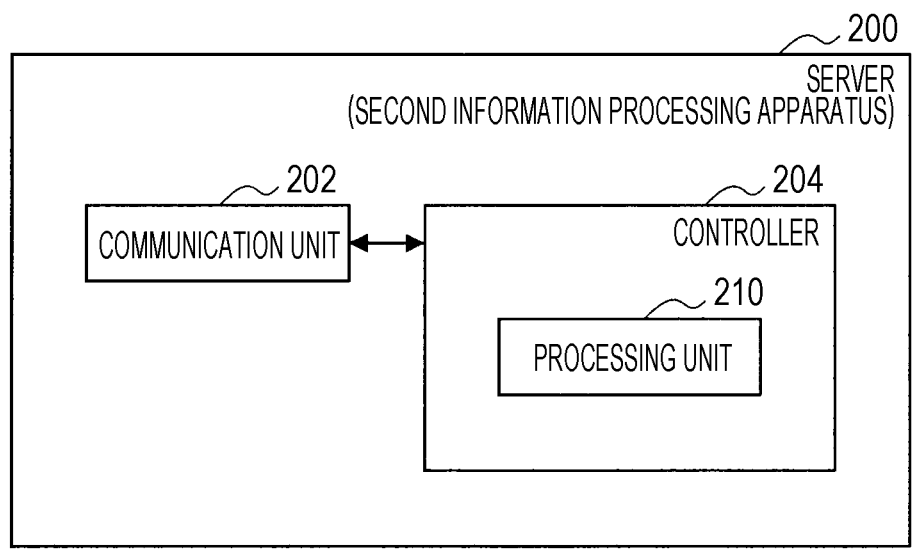
FIG. 3 is a block diagram illustrating an exemplary configuration of a server (second information processing apparatus) according to the present embodiment.

FIG. 3 is a block diagram illustrating an exemplary configuration of the server 200 (second information processing apparatus) according to the present embodiment. The server 200 includes, for example, a communication unit 202, and a controller 204.

Furthermore, the server 200 may include, for example, a ROM (not illustrated), a RAM (not illustrated), a storage (not illustrated), an operation unit (not illustrated) that can be operated by a user of the server 200, a display (not illustrated) that displays various screens on a display screen, and the like. The server 200 connects the respective components using, for example, a bus serving as a data transmission path.

The ROM (not illustrated) stores control data, such as programs and operation parameters to be used by the controller 204. The RAM (not illustrated) temporarily stores programs and the like executed by the controller 204.

The storage (not illustrated) is a storage means included in the server 200, which stores various data, such as data associated with the method for processing information applied to the server 200, and various applications. Here, examples of the storage (not illustrated) include a magnetic recording medium such as a hard disk, and a non-volatile memory such as a flash memory. Furthermore, the storage (not illustrated) may be detachable from the server 200.

Examples of the operation unit (not illustrated) include an operation input device described in an exemplary hardware configuration of the server 200 to be described later. Furthermore, examples of the display (not illustrated) include a display device described in the exemplary hardware configuration of the server 200 to be described later.

[Exemplary Hardware Configuration of the Server 200]

Figure 4:
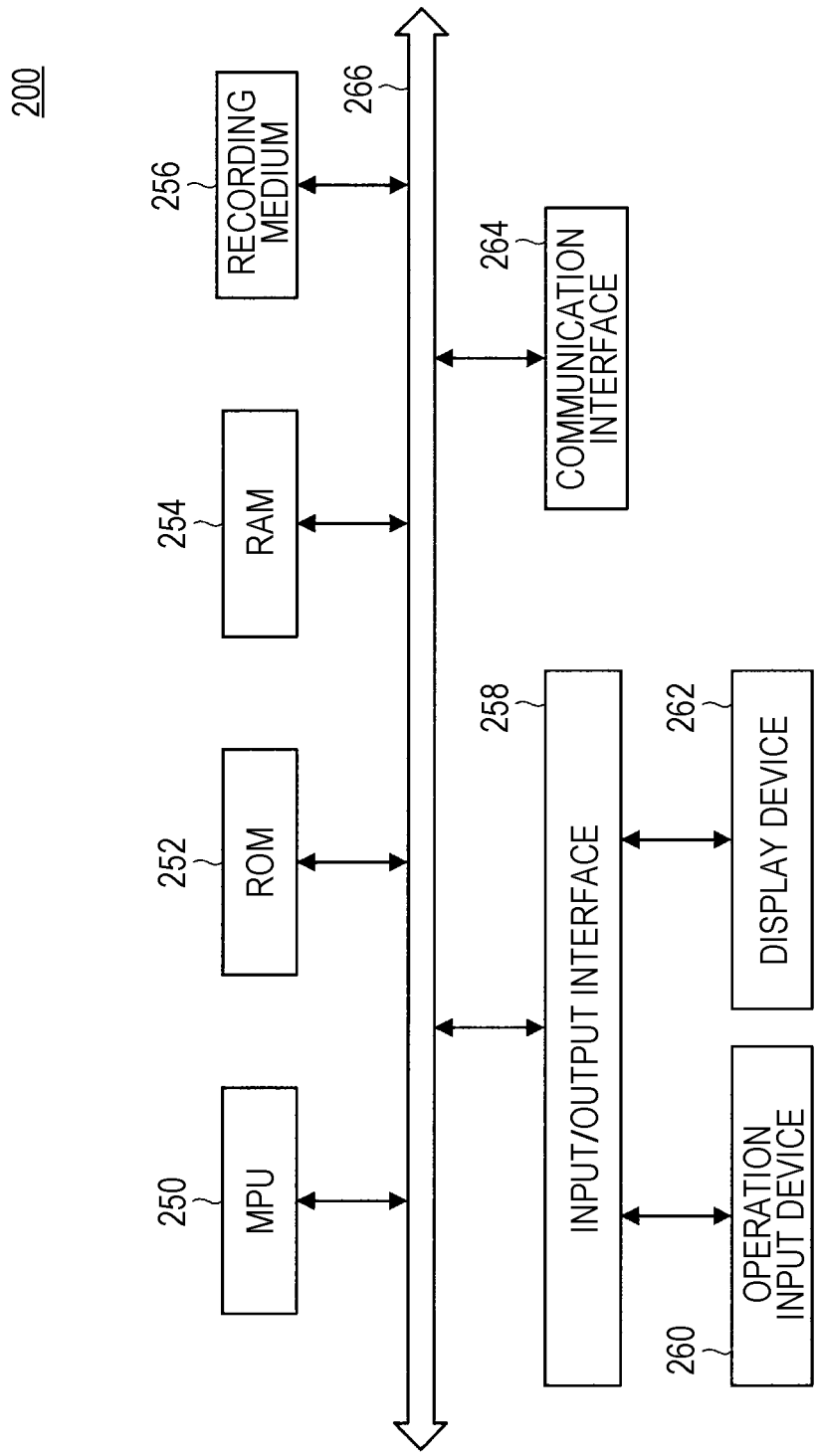
FIG. 4 is an explanatory diagram illustrating an exemplary hardware configuration of the server (second information processing apparatus) according to the present embodiment.

FIG. 4 is an explanatory diagram illustrating an exemplary hardware configuration of the server 200 (second information processing apparatus) according to the present embodiment. The server 200 includes, for example, an MPU 250, a ROM 252, a RAM 254, a recording medium 256, an input/output interface 258, an operation input device 260, a display device 262, and a communication interface 264. Furthermore, the server 200 connects the respective components using, for example, a bus 266 serving as a data transmission path. Furthermore, the server 200 is driven by, for example, power supplied from an internal power supply included in the server 200, such as a battery, power supplied from a connected external power supply, or the like.

The MPU 250 includes, for example, one or more processors including an operational circuit such as an MPU, various processing circuits, and the like, and functions as the controller 204 that controls the entire server 200. Furthermore, in the server 200, the MPU 250 functions as a processing unit 210 to be described later, for example. Note that the processing unit 210 may include a dedicated (or general-purpose) circuit (e.g., a processor separate from the MPU 250, etc.).

The ROM 252 stores control data, such as programs and operation parameters to be used by the MPU 250, and the like. The RAM 254 temporarily stores, for example, programs to be executed by the MPU 250.

The recording medium 256 functions as a storage (not illustrated), and stores various kinds of data, such as data associated with the method for processing information to be applied to the server 200, and various applications, for example. Here, examples of the recording medium 256 include a magnetic recording medium such as a hard disk, and a non-volatile memory such as a flash memory. Furthermore, the recording medium 256 may be detachable from the server 200.

The input/output interface 258 connects, for example, the operation input device 260, and the display device 262. The operation input device 260 functions as an operation unit (not illustrated), and the display device 262 functions as a display (not illustrated). Here, examples of the input/output interface 258 include a USB terminal, a digital visual interface (DVI) terminal, a high-definition multimedia interface (HDMI) (registered trademark) terminal, and various processing circuits.

Furthermore, the operation input device 260 is provided on the server 200, for example, and is connected to the input/output interface 258 inside the server 200. Examples of the operation input device 260 include a button, a direction key, a rotary selector such as a jog dial, and a combination thereof.

Furthermore, the display device 262 is provided on the server 200, for example, and is connected to the input/output interface 258 inside the server 200. Examples of the display device 262 include a liquid crystal display, and an organic EL display.

Note that it goes without saying that the input/output interface 258 can be connected to an external device, such as an operation input device (e.g., keyboard, mouse, etc.) outside the server 200, and an external display device. Furthermore, the display device 262 may be a device capable of performing display and user operation, such as a touch panel.

The communication interface 264 is a communication means included in the server 200, which functions as the communication unit 202 for communicating with, via the network 300 (or directly), an external device such as the information processing apparatus 100 by wire or wirelessly. Here, examples of the communication interface 264 include a communication antenna and an RF circuit (wireless communication), an IEEE 802.15.1 port and a transmission/reception circuit (wireless communication), an IEEE 802.11 port and a transmission/reception circuit (wireless communication), and a LAN terminal and a transmission/reception circuit (wired communication). Furthermore, the communication interface 264 may have any configuration that supports the network 300.

The server 200 performs, with the configuration illustrated in FIG. 4, for example, a process associated with the method for processing information according to the present embodiment in the server 200 to be described later. Note that the hardware configuration of the server 200 according to the present embodiment is not limited to the configuration illustrated in FIG. 4.

For example, in a case where the server 200 communicates with an external device via an external communication device connected thereto, it may not include the communication interface 264. Furthermore, the communication interface 264 may have a configuration capable of communicating with one or more external devices using a plurality of communication schemes.

Furthermore, the server 200 can take a configuration not including a part of or all of the recording medium 256, the operation input device 260, and the display device 262, for example.

Furthermore, the server 200 can take a configuration corresponding to exemplary application of the server 200 (second information processing apparatus) to be described later, for example.

Furthermore, a part of or all of the configuration (or a configuration according to variations) illustrated in FIG. 4 may be implemented by one or more integrated circuits (ICs), for example.

With reference to FIG. 3 again, an exemplary configuration of the server 200 will be described. The communication unit 202 is a communication means included in the server 200, which communicates with, via the network 300 (or directly), an external device such as the information processing apparatus 100 by wire or wirelessly. Furthermore, communication of the communication unit 202 is controlled by, for example, the controller 204.

Here, although examples of the communication unit 202 include a communication antenna, an RF circuit, a LAN terminal, and a transmission/reception circuit, the configuration of the communication unit 202 is not limited to the above. For example, the communication unit 202 can take a configuration supporting any standard capable of performing communication, such as a USB terminal and a transmission/reception circuit, or can take any configuration capable of communicating with an external device via the network 300. Furthermore, the communication unit 202 may have a configuration capable of communicating with one or more external devices using a plurality of communication schemes.

The controller 204 includes, for example, an MPU, and functions to control the entire server 200. Furthermore, the controller 204 includes, for example, the processing unit 210, and functions to lead a process associated with the method for processing information in the server 200 to be described later.

The processing unit 210 functions to lead the process associated with the method for processing information in the server 200. An example of the process associated with the method for processing information in the server 200 will be described later.

Note that the configuration of the server (second information processing apparatus) according to the present embodiment is not limited to the configuration illustrated in FIG. 3.

For example, the server according to the present embodiment can include the processing unit 210 illustrated in FIG. 3 separately from the controller 204 (e.g., implement it with another processing circuit).

Furthermore, the configuration of the server according to the present embodiment is not limited to the configuration illustrated in FIG. 3, and a configuration corresponding to how the process associated with the method for processing information in the server 200 to be described later is separated can be adopted.

Furthermore, in a case where communication is performed with an external device via an external communication device having a function and a configuration similar to those of the communication unit 202, for example, the information processing apparatus according to the present embodiment may not include the communication unit 202.

[1-3] Exemplary Application of Each Device Included in the Information Processing System According to the Present Embodiment Although the information processing apparatus 100 (first information processing apparatus) has been described above as an example of the component of the information processing system according to the present embodiment, the present embodiment is not limited to such a mode. The present embodiment can be applied to various devices capable of performing the process associated with the method for processing information in the information processing apparatus 100 to be described later, such as a "communication device such as a smartphone", "computer such as a personal computer (PC)", "tablet device", and "game machine". Furthermore, the present embodiment can be applied to an IC that can be incorporated into the devices as described above, for example.

Furthermore, although the server 200 (second information processing apparatus) has been described as an example of the component of the information processing system according to the present embodiment, the present embodiment is not limited to such a mode. The present embodiment can be applied to various devices capable of performing the process associated with the method for processing information in the server 200 to be described later, such as a "computer such as a PC and a server", "tablet device", and "communication device such as a smartphone". Furthermore, the present embodiment can be applied to an IC that can be incorporated into the devices as described above, for example.

Furthermore, the server 200 according to the present embodiment can be applied to a processing system premised on connection to the network 300 (or communication between devices), such as cloud computing. Examples of the processing system include a "system in which one device included in the processing system performs a part of the process associated with the method for processing information in the server 200 to be described later and another device included in the processing system performs a process other than the part of the process associated with the method for processing information according to the present embodiment".

[2] Method for Processing Information According to the Present Embodiment

Next, a process associated with a method for processing information according to the present embodiment will be described using, as an example, communication between the information processing apparatus 100 and the server 200 in the information processing system 1000 described above.

[2-1] Method for Suppressing an Interrupt of a Process Other than a Series of Processes As described above, examples of the method of suppressing an interrupt of a process other than the series of processes include "maintaining a session during the series of processes using each device performing the series of processes".

Figure 5:
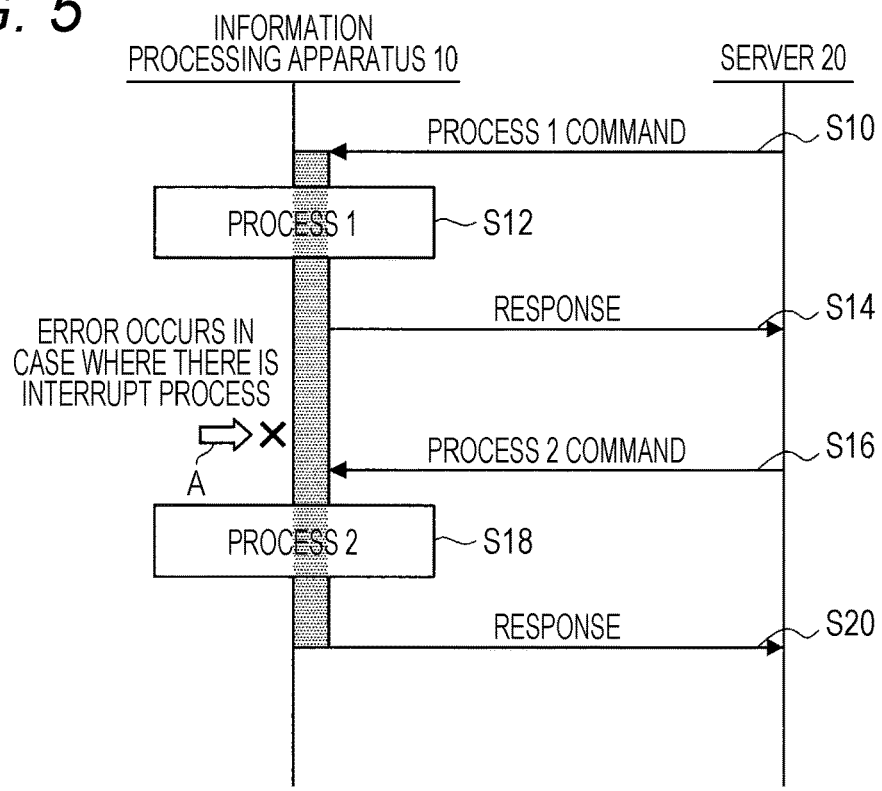
FIG. 5 is an explanatory diagram illustrating an exemplary use case in which an interrupt of a process other than a series of processes is suppressed by a session being maintained.

FIG. 5 is an explanatory diagram illustrating an exemplary use case in which an interrupt of a process other than the series of processes is suppressed by a session being maintained. FIG. 5 illustrates exemplary communication between an information processing apparatus 10 (e.g., UICC included in the information processing apparatus 10) and a server 20 included in an information processing system having a configuration similar to that of the information processing system 1000 illustrated in FIG. 1. Furthermore, in FIG. 5, a process 1 and a process 2 correspond to the series of processes.

The server 20 transmits a process 1 command for executing the process 1 (S10).

The information processing apparatus 10 that has received the process 1 command transmitted from the server 20 in step S10 maintains a session with the server 20. As illustrated in A of FIG. 5, with the session being maintained, in a case where an interrupt of a process other than the series of processes occurs, a process corresponding to the interrupt (hereinafter referred to as "interrupt process") is to be an error in the information processing apparatus 10. That is, with the session being maintained, influence of the interrupt process being exerted on the series of processes is suppressed.

Furthermore, the information processing apparatus 10 executes the process 1 corresponding to the received process 1 command (S12), and makes a response to the process 1 command (S14). Examples of the response transmitted by the information processing apparatus 10 in step S14 include a normal response indicating that the process 1 has been completed normally, and an error response indicating that the process 1 has not been completed normally. The normal response indicating that the process corresponding to the command according to the present embodiment has been completed normally may be a process result of the process (e.g., data read out in response to a readout command, etc.).

The server 20 that has received the response transmitted from the information processing apparatus 10 in step S14 transmits a process 2 command for executing the process 2 in the case where the received response is a normal response (S16).

The information processing apparatus 10 that has received the process 2 command transmitted from the server 20 in step S16 executes the process 2 corresponding to the received process 2 command (S18), and makes a response to the process 2 command (S20). Examples of the response transmitted by the information processing apparatus 10 in step S20 include a normal response indicating that the process 2 has been completed normally, and an error response indicating that the process 2 has not been completed normally.

As exemplified in FIG. 5, the process 1 and the process 2 are executed as a series of processes between the server 20 and the information processing apparatus 10. Furthermore, as indicated by A in FIG. 5, the interrupt process is to be an error in the case where the session is maintained, whereby influence of the interrupt process being exerted on the series of processes is suppressed.

Furthermore, as described above, in a case where the series of processes are performed between devices, a relay component may intervene in the communication between the devices. Furthermore, in a case where a relay component intervenes, the relay component also needs to maintain the session to suppress an interrupt of a process other than the series of processes due to the session.

Figure 6:
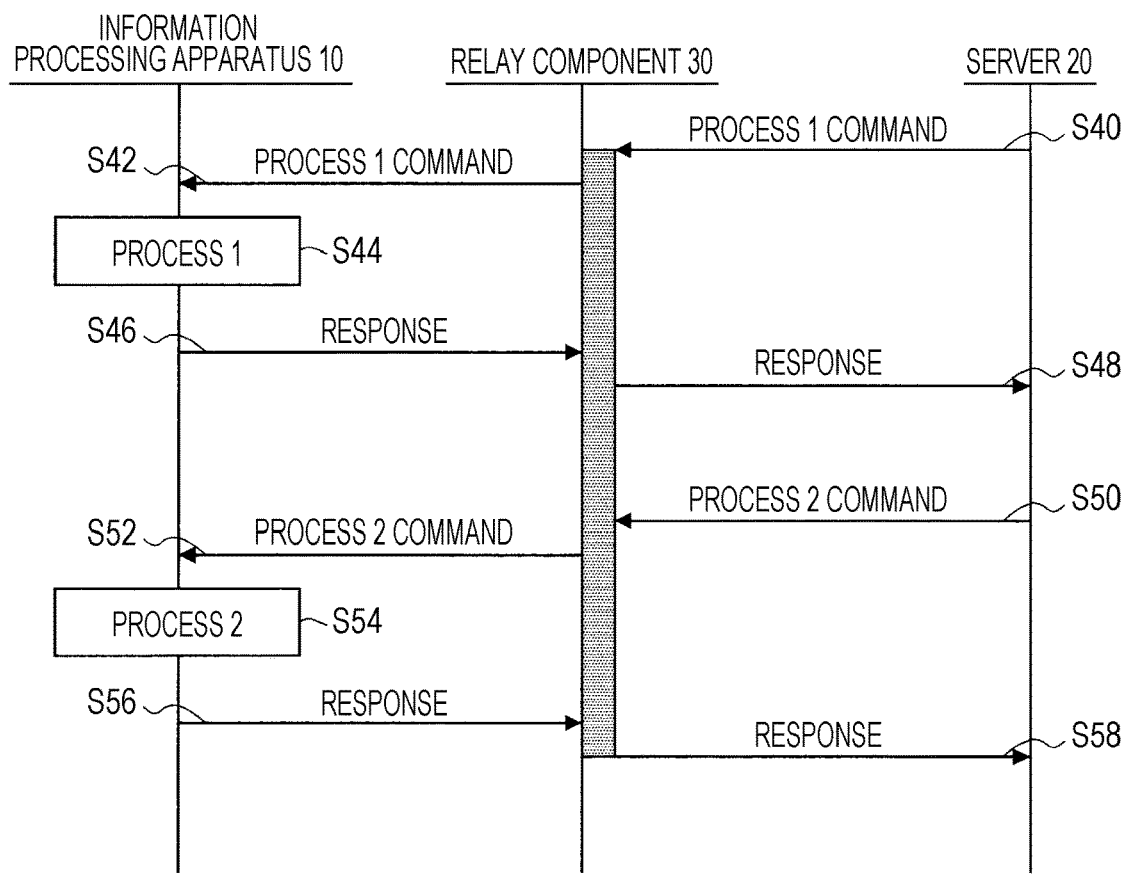
FIG. 6 is an explanatory diagram illustrating an exemplary use case in which a session is maintained in a case where a relay component intervenes.

FIG. 6 is an explanatory diagram illustrating an exemplary use case in which a session is maintained in the case where a relay component intervenes, which illustrates a use case in which a relay component 30 intervenes in communication between the information processing apparatus 10 and the server 20 illustrated in FIG. 5. Examples of the relay component 30 include one or both of "a device other than the information processing apparatus 10 and the server 20, such as a relay server" and "software to be executed in the information processing apparatus 10, such as an application and a driver". Hereinafter, an exemplary case where the relay component 30 is "a device other than the information processing apparatus 10 and the server 20, such as a relay server" will be described.

Furthermore, in FIG. 6, a process 1 and a process 2 correspond to the series of processes in a similar manner to FIG. 5.

The server 20 transmits a process 1 command (S40).

The relay component 30 that has received the process 1 command transmitted from the server 20 in step S10 maintains a session between the information processing apparatus 10 and the server 20. With the session being maintained, the relay component 30 can relay communication associated with a series of processes between the information processing apparatus 10 and the server 20.

Furthermore, the relay component 30 transmits the received process 1 command to the information processing apparatus 10 (S42).

The information processing apparatus 10 that has received the process 1 command transmitted from the relay component 30 in step S42 executes the process 1 corresponding to the received process 1 command (S44), and makes a response to the process 1 command (S46). Examples of the response transmitted by the information processing apparatus 10 in step S46 include a normal response indicating that the process 1 has been completed normally, and an error response indicating that the process 1 has not been completed normally. Note that, although illustrating is omitted in FIG. 6, the session is maintained in the information processing apparatus 10 that has received the process 1 command in a similar manner to FIG. 5, for example.

The relay component 30 that has received the response transmitted from the information processing apparatus 10 in step S46 transmits the received response to the server 20 (S48).

The server 20 that has received the response transmitted from the relay component 30 in step S48 transmits a process 2 command in the case where the received response is a normal response (S50).

The relay component 30 that has received the process 2 command transmitted from the server 20 in step S50 transmits the received process 2 command to the information processing apparatus 10 (S52).

The information processing apparatus 10 that has received the process 2 command transmitted from the relay component 30 in step S52 executes the process 2 corresponding to the received process 2 command (S54), and makes a response to the process 2 command (S56). Examples of the response transmitted by the information processing apparatus 10 in step S56 include a normal response indicating that the process 2 has been completed normally, and an error response indicating that the process 2 has not been completed normally.

The relay component 30 that has received the response transmitted from the information processing apparatus 10 in step S56 transmits the received response to the server 20 (S58).

In a case where the relay component 30 intervenes, as exemplified in FIG. 6, the process 1 and the process 2 are executed as a series of processes between the server 20 and the information processing apparatus 10. Furthermore, an interrupt process is to be an error in the case where the session is maintained, whereby influence of the interrupt process being exerted on the series of processes is suppressed.

However, in a case where the relay component needs to maintain the session, there are disadvantages described above compared with the case where the relay component does not maintain the session.

On the other hand, in a case where the session is not maintained in the series of processes to avoid the disadvantages described above, the interrupt process may affect the series of processes.

Figure 7:
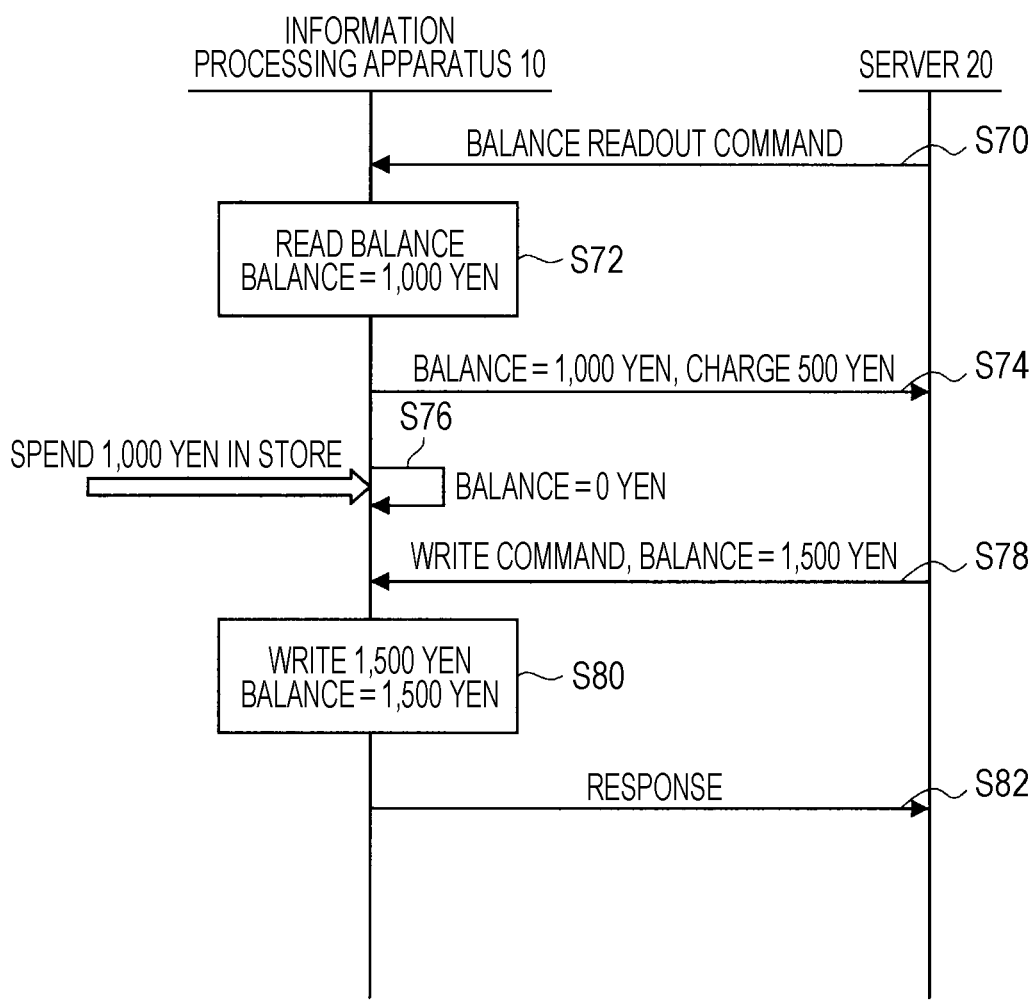
FIG. 7 is an explanatory diagram illustrating an exemplary use case in which a session is not maintained.

FIG. 7 is an explanatory diagram illustrating an exemplary use case in which a session is not maintained, which illustrates an exemplary process (example of a series of processes) for updating a value of an electronic value stored in the information processing apparatus 10, the process being performed between the information processing apparatus 10 and the server 20. Hereinafter, a value of the electronic value stored in the information processing apparatus 10 may be referred to as an "electronic value balance", or may be simply referred to as a "balance".

The server 20 transmits a readout command for reading out the balance of the electronic value to the information processing apparatus 10 (S70).

The information processing apparatus 10 that has received the readout command transmitted from the server 20 in step S70 executes the readout command, and reads out 1,000 yen, which is the balance of the electronic value (S72).

For example, in a case where the electronic value in the amount of 500 yen is to be charged, the information processing apparatus 10 transmits, to the server 200, the balance of the electronic value read out in step S72 and the value of the electronic value to be charged (S74). The read balance of the electronic value transmitted from the information processing apparatus 10 in step S74 corresponds to an exemplary normal response indicating that the process corresponding to the readout command has been completed normally.

It is assumed an exemplary case where the electronic value in the amount of 1,000 yen has been used in a store or the like after the processing of step S74 is performed and before the next command is transmitted from the server 20 in step S78 to be described later. Here, the process performed at the time when the electronic value in the amount of 1,000 yen is used in a store or the like corresponds to the interrupt process. In the case above, in a case where the session is not maintained, the balance of the electronic value stored in the information processing apparatus 10 is 0 yen (S76).

The server 20 that has received the read balance of the electronic value and the value of the electronic value to be charged, which have been transmitted from the information processing apparatus 10 in step S14, performs electronic value addition processing. Then, the server 20 transmits, to the information processing apparatus 10, a write command and 1,500 yen (value of the electronic value after the addition processing) that is the value of the electronic value to be written in the information processing apparatus 10 (S78).

The information processing apparatus 10 that has received the write command transmitted from the server 20 in step S78 executes the write command, and updates the balance of the electronic value with the value of the electronic value to be written transmitted from the server 20 (S80). With the processing in step S80 being performed, the balance of the electronic value stored in the information processing apparatus 10 becomes 1,500 yen.

When the balance of the electronic value is updated in step S80, the information processing apparatus 10 makes a normal response indicating that the write command has been completed normally (S82).

In a case where the session is not maintained in the series of processes between the information processing apparatus 10 and the server 20, a process as illustrated in FIG. 6 can be performed between the information processing apparatus 10 and the server 20.

Here, in the use case illustrated in FIG. 6, although server 20 has received a request for charging the electronic value in the amount of 500 yen, the electronic value in the amount of 1,500 yen is to be charged practically due to the interrupt process being performed.

Therefore, in order to avoid the disadvantages in the case where the session is maintained, simply not maintaining the session in the series of processes is not preferable.

[2-2] Overview of the Method for Processing Information According to the Present Embodiment In view of the above, in the information processing system 1000 according to the present embodiment, the information processing apparatus 100 detects an interrupt of a process other than a series of processes with respect to the started series of processes, and changes contents of a process to be performed after detection of the interrupt on the basis of an interrupt detection state.

Furthermore, in the information processing system 1000, the server 200 controls "interrupt detection in the information processing apparatus 100" or "interrupt detection in the information processing apparatus 100 and use of the interrupt detection state in the information processing apparatus 100", for example.

The contents of the process to be performed after an interrupt is detected on the basis of the interrupt detection state are changed in the information processing apparatus 100, thereby suppressing influence of the interrupt process being exerted on the series of processes in the information processing system 1000.

Accordingly, an information processing system capable of performing a series of processes between devices without maintaining a session can be implemented.

[2-3] Process Associated with the Method for Processing Information According to the Present Embodiment Hereinafter, each of examples of the process associated with the method for processing information in the information processing apparatus 100, the process associated with the method for processing information in the server 200, and the process in the information processing system 1000 will be described.

[2-3-1] Process Associated with the Method for Processing Information in the Information Processing Apparatus 100

The information processing apparatus 100 performs a series of processes with an external device such as the server 200. Furthermore, the information processing apparatus 100 detects an interrupt of a process other than the series of processes with respect to the started series of processes, and changes contents of a process to be performed after detection of the interrupt on the basis of an interrupt detection state.

More specifically, the information processing apparatus 100 performs, for example, the following (1) detection process and (2) execution process as processes associated with the method for processing information. In the information processing apparatus 100, for example, the execution process to be described below is performed by the processing unit 110, and the detection process is performed by the detection unit 112.

(1) Detection Process

The information processing apparatus 100 detects an interrupt of a process other than the series of processes with respect to the started series of processes. The information processing apparatus 100 detects an interrupt in the case where, for example, "a command other than the command obtained from a communication path related to the started series of processes" is obtained. Examples of the "command other than the command obtained from a communication path related to the started series of processes" include a command received from the reader/writer 400 after the series of processes is started with the server 200. Note that the "command other than the command obtained from a communication path related to the started series of processes" is not limited to a command transmitted from an external device, and may be a command generated in the information processing apparatus 100, such as a command generated in response to operation made on an operation unit (not illustrated) of the information processing apparatus 100.

The information processing apparatus 100 starts interrupt detection on the basis of, for example, a start command for staring the interrupt detection transmitted from the server 200 (exemplary external device). With the interrupt detection being started on the basis of the start command, the interrupt detection in the information processing apparatus 100 is controlled by the server 200.

Note that the trigger for the information processing apparatus 100 to start the detection process is not limited to the start command transmitted from the external device. For example, the information processing apparatus 100 may automatically start the detection process at the time when the series of processes starts with the external device.

The information processing apparatus 100 updates interrupt detection information indicating an interrupt detection state on the basis of an interrupt detection result. The information processing apparatus 100 updates the interrupt detection information corresponding to any interrupt process, which is stored in a storage (not illustrated), for example. Note that the information processing apparatus 100 may generate interrupt detection information corresponding to the detected interrupt process each time an interrupt process is detected, and may update the interrupt detection information for each detected interrupt process, for example.

For example, the interrupt detection information is stored in a storage (not illustrated) including a non-volatile memory or the like, and is updated on the basis of the interrupt detection result, whereby the interrupt detection state is maintained even in the case where the information processing apparatus 100 is not supplied with power.

Examples of the interrupt detection information according to the present embodiment include a flag indicating a state in which an interrupt is detected or a state in which no interrupt is detected. Note that the interrupt detection information according to the present embodiment is not limited to a flag, and may be data in any format capable of indicating an interrupt detection state.

Hereinafter, an exemplary case where the interrupt detection information is a flag corresponding to an optional interrupt process will be described. Furthermore, a flag indicating an interrupt detection state will be referred to as a "interrupt detection flag" in the following descriptions.

Examples of updating of the interrupt detection information include a first example described in the following (A) to a third example described in the following (C).

(A) First Example of Updating of Interrupt Detection Information

In a case where an interrupt is detected, the information processing apparatus 100 updates the detection state indicated by the interrupt detection information to a state in which the interrupt is detected. For example, in a case where an interrupt is detected, the information processing apparatus 100 updates the value of the interrupt detection flag to a value indicating a state in which the interrupt is detected.

(B) Second Example of Updating of Interrupt Detection Information

When the interrupt detection starts, the information processing apparatus 100 initializes the detection state indicated by the interrupt detection information to a state in which no interrupt is detected. For example, when the interrupt detection starts, the information processing apparatus 100 updates the value of the interrupt detection flag to a value indicating a state in which no interrupt is detected.

(C) Third Example of Updating of Interrupt Detection Information

The information processing apparatus 100 performs both of the updating according to the first example described in (A) above and the updating according to the second example described in (B) above, there by updating the interrupt detection information.

(2) Execution Process

The information processing apparatus 100 performs a series of processes with an external device such as the server 200.

Furthermore, the information processing apparatus 100 changes contents of a process to be performed after detection of the interrupt on the basis of an interrupt detection state (normal processing). The information processing apparatus 100 specifies the interrupt detection state by referring to the interrupt detection information, and changes the contents of the process to be performed after detection of the interrupt.

More specifically, in a case where the interrupt detection state is a state in which an interrupt is detected, for example, the information processing apparatus 100 does not carry out the process to be performed after detection of the interrupt.

Note that the example of changing the contents of the process to be performed after detection of the interrupt on the basis of the interrupt detection state is not limited to the example described above. The information processing apparatus 100 may perform first exception handling described in (a) below to third exception handling described in (c) below, for example.

(a) First Exception Handling

In a case where the process to be performed after detection of the interrupt is a predetermined process that has been set, the information processing apparatus 100 carries out the process to be performed after detection of the interrupt regardless of the interrupt detection state.

Examples of the predetermined process according to the first exception handling include a process not involving information change due to the process being performed, such as a readout process to be performed in response to a readout command. Note that the predetermined process is not limited to the example described above, and may be any process not affected by the interrupt process.

For example, the information processing apparatus 100 determines whether or not the process to be performed after detection of the interrupt is the predetermined process by referring to a table (or database) in which the predetermined process is registered. Furthermore, the information processing apparatus 100 may determine whether or not the process to be performed after detection of the interrupt is the predetermined process on the basis of the contents of the process to be performed after detection of the interrupt, such as searching the command included in the process to be performed after detection of the interrupt for a command corresponding to a process involving information change.

(b) Second Exception Handling

The information processing apparatus 100 changes the contents of the process to be performed after detection of the interrupt on the basis of a confirmation command indicating whether or not to confirm the interrupt detection state transmitted from an external device such as the server 200.

In a case where the obtained confirmation command indicates that the interrupt detection state is to be confirmed, the information processing apparatus 100 changes the contents of the process to be performed after detection of the interrupt on the basis of the interrupt detection state. The process to be performed in the case where the confirmation command indicates that the interrupt detection state is to be confirmed is similar to the normal processing in the execution process.

Furthermore, in a case where the obtained confirmation command indicates that the interrupt detection state is not to be confirmed, the information processing apparatus 100 does not change the contents of the process to be performed after detection of the interrupt regardless of the interrupt detection state.

(c) Third Exception Handling

The information processing apparatus 100 performs both of the first exception handling described in (a) above and the second exception handling described in (b) above.

The information processing apparatus 100 detects an interrupt of a process other than a series of processes with respect to the started series of processes, and changes contents of a process to be performed after detection of the interrupt on the basis of an interrupt detection state by, for example, performing the process (detection process) of (1) described above and the process (execution process) of (2) described above.

Note that the process (detection process) of (1) described above and the process (execution process) of (2) described above are obtained by separating the process associated with the method for processing information in the information processing apparatus 100 for the sake of convenience. Therefore, each process associated with the method for processing information in the information processing apparatus 100 can be regarded as one process, or may be regarded as two or more processes depending on an optional separation method, for example.

[2-3-2] Process Associated with the Method for Processing Information in the Server 200

The server 200 performs a series of processes with an external device such as the information processing apparatus 100.

Furthermore, the server 200 controls "interrupt detection in the external device" or "interrupt detection in the external device and use of the interrupt detection state in the external device".

More specifically, the server 200 causes a start command for causing an external device such as the information processing apparatus 100 to start interrupt detection to be transmitted to the external device. The server 200 causes the start command to be transmitted to the external device by controlling the communication unit 202 (or external communication device).

For example, the server 200 causes the start command to be transmitted to the information processing apparatus 100 (exemplary external device), whereby the detection process starts in the information processing apparatus 100. Therefore, the server 200 can control the "interrupt detection in the external device" by causing the start command to be transmitted to the external device such as the information processing apparatus 100.

Furthermore, the server 200 may cause a confirmation command indicating whether or not to confirm the interrupt detection state to be transmitted to the external device after the series of processes starts.

For example, the server 200 causes the start command to be transmitted to the information processing apparatus 100 (exemplary external device), whereby the second exception handling described in (b) above is performed in the information processing apparatus 100. Therefore, the server 200 can control the "use of the interrupt detection state in the external device" by causing the confirmation command to be transmitted to the external device such as the information processing apparatus 100.

The server 200 controls the "interrupt detection in the external device" by causing the start command to be transmitted to the external device, for example. Furthermore, the server 200 controls the "interrupt detection in the external device and use of the interrupt detection state in the external device" by causing each of the start command and the confirmation command to be transmitted to the external device, for example.

[2-3-3] Exemplary Process in the Information Processing System 1000

Next, an exemplary process in the information processing system 1000 will be described.

Figure 8:
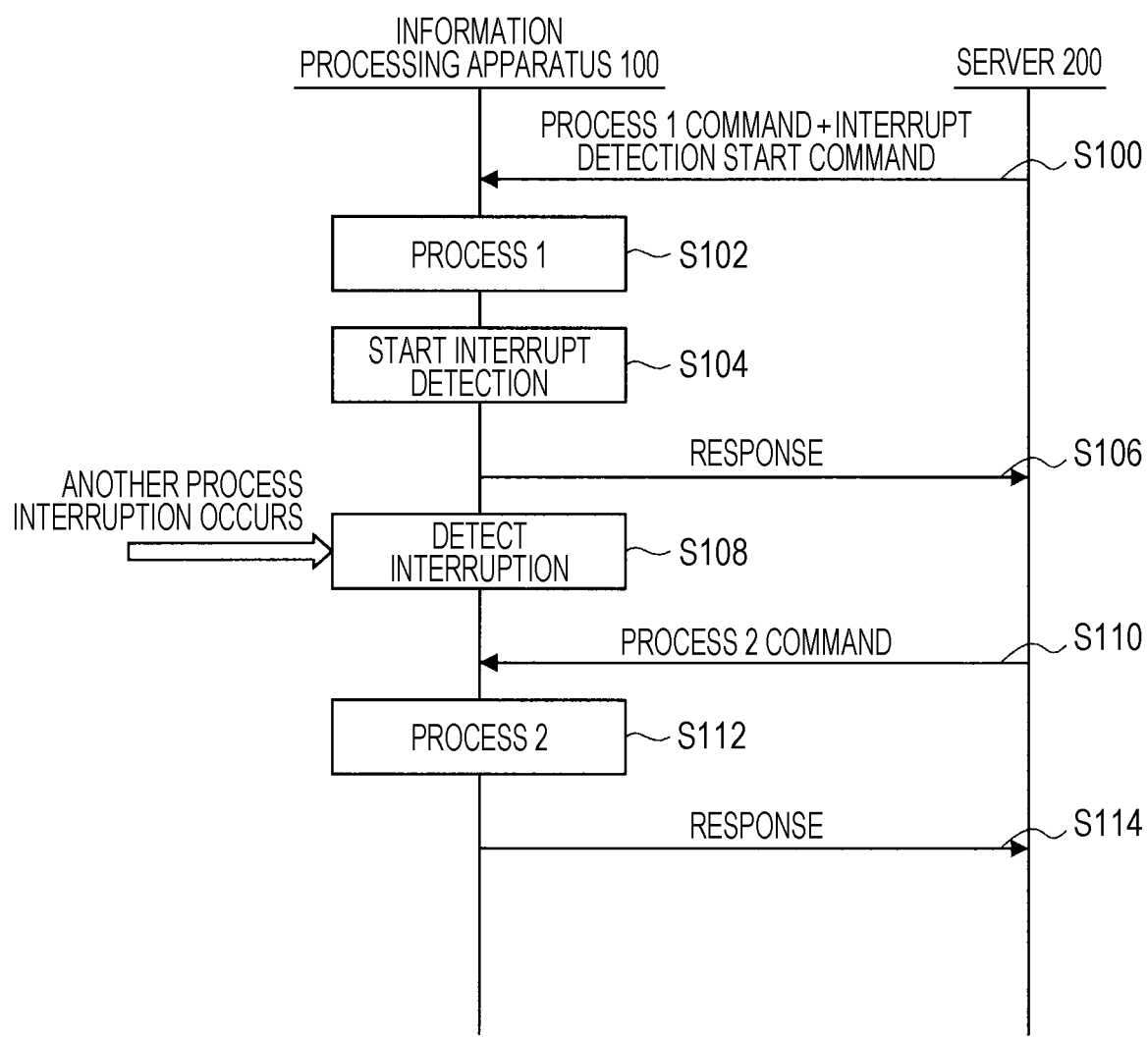
FIG. 8 is an explanatory diagram for illustrating an exemplary process in the information processing system according to the present embodiment.

FIG. 8 is an explanatory diagram for illustrating an exemplary process in the information processing system 1000 according to the present embodiment. FIG. 8 illustrates exemplary communication between the information processing apparatus 100 (e.g., UICC included in the information processing apparatus 100) and the server 200 included in the information processing system 1000 illustrated in FIG. 1. Furthermore, in FIG. 8, a process 1 and a process 2 correspond to the series of processes.

Note that, although a relay component is not illustrated in FIG. 8, a relay component may intervene in communication between the information processing apparatus 100 and the server 200. Since the information processing system 1000 is a system capable of performing a series of processes between devices without maintaining a session, even in the case where a relay component intervenes, the relay component does not need to maintain the session. That is, the relay component included in the information processing system 1000 only needs to have a function of at least relaying communication between the information processing apparatus 100 and the server 200. Note that it goes without saying that the relay component included in the information processing system 1000 may be able to maintain a session.

The server 200 transmits a process 1 command for executing the process 1 and a start command for starting interrupt detection (S100).

The information processing apparatus 100 that has received the process 1 command and the start command transmitted from the server 200 in step S100 executes the process 1 corresponding to the received process 1 command (S102). Furthermore, the information processing apparatus 100 starts a detection process on the basis of the received start command (S104).

After executing the process 1 in step S102, the information processing apparatus 100 makes a response to the process 1 command in a similar manner to step S14 in FIG. 5 (S104).

When an interrupt of a process other than the series of processes occurs, the information processing apparatus 100 detects the interrupt by the detect process (S108). When the interrupt is detected, the information processing apparatus 100 updates the value of the interrupt detection flag (exemplary interrupt detection information; same applies hereinafter) to a value indicating a state in which the interrupt is detected, for example.

The server 200 that has received the response transmitted from the information processing apparatus 100 in step S106 transmits a process 2 command for executing the process 2 in the case where the received response is a normal response (S110). Note that, although not illustrated in FIG. 8, the server 200 may further transmit a confirmation command in step S110.

The information processing apparatus 100 that has received the process 2 command transmitted from the server 200 in step S110 changes the contents of the process 2 (exemplary process to be performed after detection of the interrupt) corresponding to the received process 2 command on the basis of the interrupt detection state (S112).

Here, in the example illustrated in FIG. 8, an interrupt is detected in step S108. Therefore, in a case where a normal process is performed, the information processing apparatus 100 does not execute the process 2 corresponding to the process 2 command, for example. Furthermore, in a case where the first exception handling described in (a) above, the process 2 is executed regardless of the interrupt detection state if the process 2 is a predetermined process.

Note that the process in step S112 is not limited to the example described above. For example, in a case where the server 200 transmits a confirmation command in step S110, the information processing apparatus 100 may perform the second exception handling described in (b) above on the basis of the received confirmation command.

After executing the process in step S112, the information processing apparatus 100 makes a response to the process 2 command in a similar manner to step S20 in FIG. 5 (S114).

As exemplified in FIG. 8, the process 1 and the process 2 are executed as a series of processes between the server 200 and the information processing apparatus 100. Furthermore, the detection process of (1) described above and the process (execution process) of (2) described above are performed in the information processing apparatus 100, thereby implementing performing of the series of processes between the devices without the session being maintained in the information processing system 1000.

Hereinafter, a process associated with the interrupt detection in the process of the information processing apparatus 100 in FIG. 8 will be described more specifically.

Figure 9:
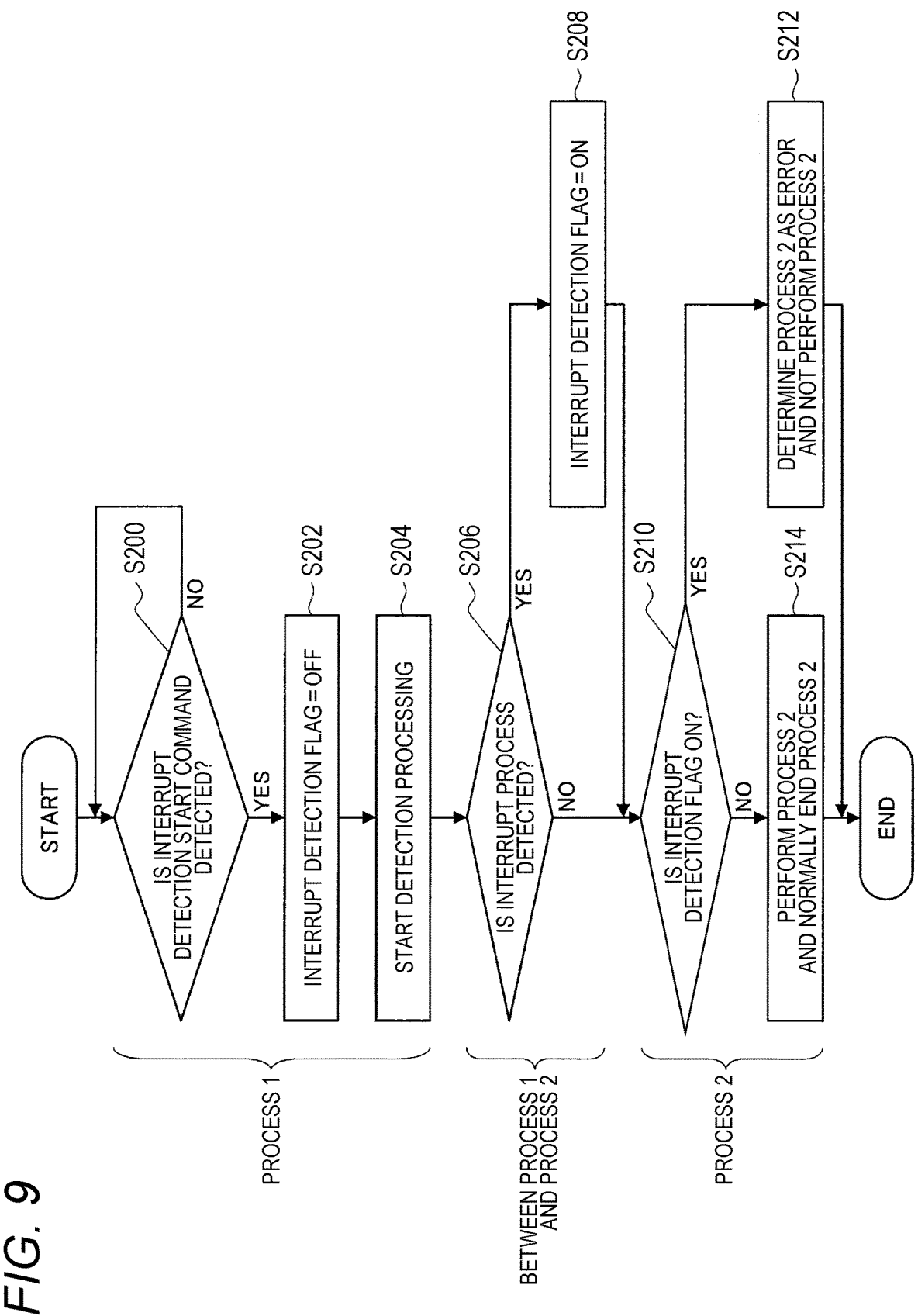
FIG. 9 is a flowchart for illustrating an exemplary process associated with a method for processing information in the information processing apparatus according to the present embodiment.

FIG. 9 is a flowchart for illustrating an exemplary process associated with the method for processing information in the information processing apparatus 100 according to the present embodiment. FIG. 9 illustrates a process associated with the interrupt detection in the process of the information processing apparatus 100 in FIG. 8, in other words, a part of the process of the information processing apparatus 100 in FIG. 8. More specifically, a process in steps S200 to S204 illustrated in FIG. 9 corresponds to the process at the time when the process 1 is performed between the information processing apparatus 100 and the server 200 in FIG. 8. The processing in step S206 and the processing in step S208 illustrated in FIG. 9 correspond to the process performed between the process 1 and the process 2 in FIG. 8. Further, a process in steps S210 to S212 illustrated in FIG. 9 corresponds to the process at the time when the process 2 is performed between the information processing apparatus 100 and the server 200 in FIG. 8.

The information processing apparatus 100 determines whether or not a start command of interrupt detection is detected (S200). In a case where it is not determined in step S200 that the start command is detected, the information processing apparatus 100 does not proceed with the process associated with the interrupt detection until it is determined that the start command is detected.

In a case where it is determined in step S200 that the start command is detected, the information processing apparatus 100 updates the interrupt detection flag to a value indicating OFF corresponding to the state in which the interrupt is not detected (S202). Then, the information processing apparatus 100 starts a detection process (S204). The processing in step S202 corresponds to initialization of the interrupt detection flag.

When the detection process starts, the information processing apparatus 100 determines whether or not the interrupt process is detected (S206).

In a case where it is determined in step S206 that the interrupt process is detected, the information processing apparatus 100 updates the interrupt detection flag to a value indicating ON corresponding to the state in which the interrupt is detected (S208).

Furthermore, in a case where it is not determined in step S206 that the interrupt process is detected, the information processing apparatus 100 does not update the interrupt detection flag. That is, in a case where it is not determined in step S206 that the interrupt process is detected, the interrupt detection flag remains in the state initialized in step S202.

When a process 2 command is obtained, the information processing apparatus 100 determines whether or not the interrupt detection flag is ON before execution of the process 2 corresponding to the process 2 command (S210).

In a case where it is determined in step S210 that the interrupt detection flag is ON, the information processing apparatus 100 sets the process 2 corresponding to the process 2 command as an error, and does not execute the process 2 (S212).

Furthermore, in a case where it is not determined in step S210 that the interrupt detection flag is ON, the information processing apparatus 100 executes the process 2 corresponding to the process 2 command, and normally terminates the process 2 (S214).

The information processing apparatus 100 performs, for example, the process illustrated in FIG. 9 as a process associated with the interrupt detection in the process of the information processing apparatus 100 in FIG. 8.

For example, with the process illustrated in FIG. 9 being performed, the contents of the process 2 change depending on the presence or absence of the interrupt process from the process 1 to the process 2, whereby consistency between the process 1 and the process 2 can be maintained.

Note that the process associated with the interrupt detection in the process of the information processing apparatus 100 in FIG. 8 is not limited to the process illustrated in FIG. 9. As described above, the information processing apparatus 100 can perform, for example, any of the first exception handling described in (a) above to the third exception handling described in (c) above. Hereinafter, as an example of the case where exception handling is performed, an exemplary process in the case where the information processing apparatus 100 performs the first exception handling described in (a) above will be described.

Figure 10:
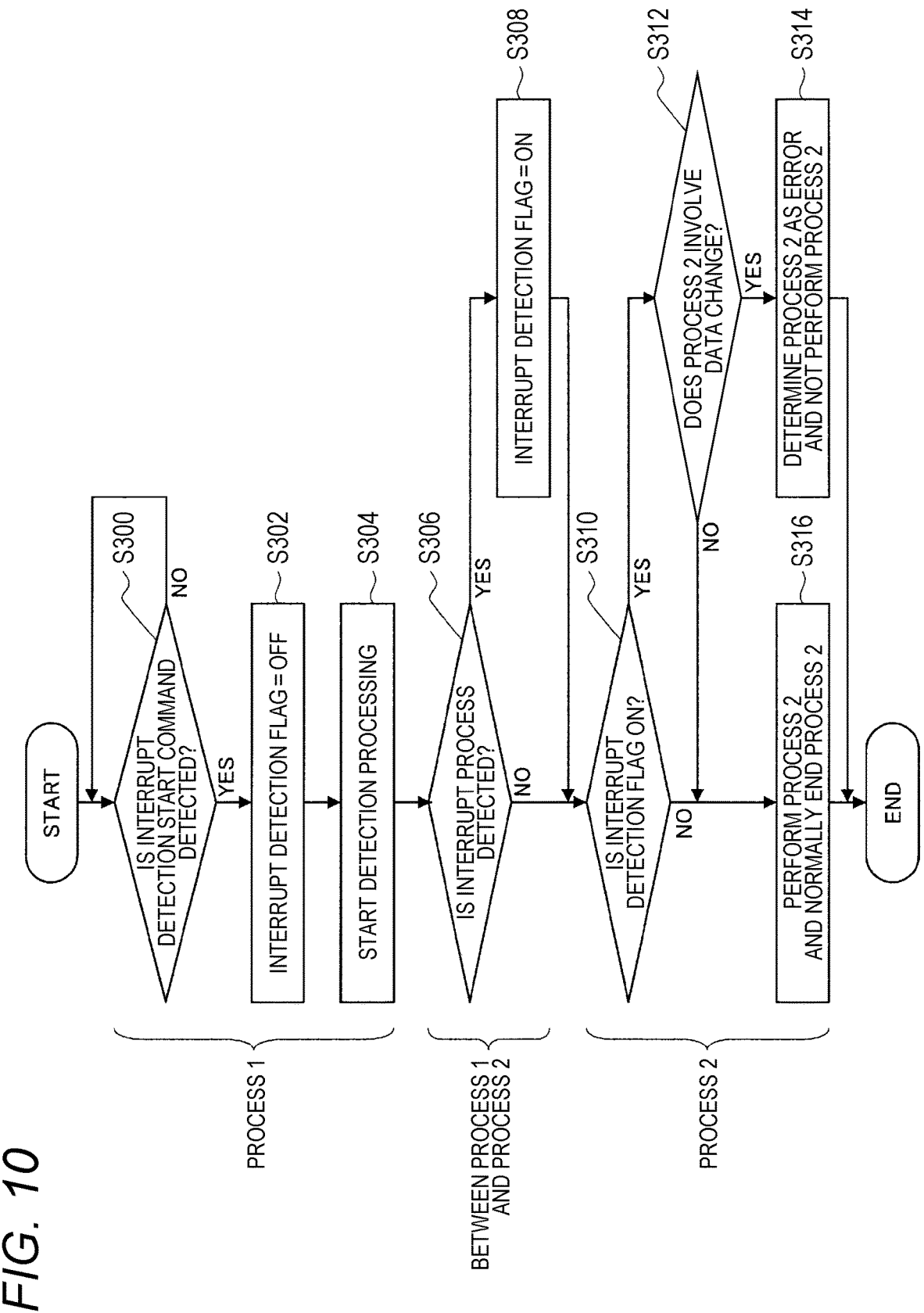
FIG. 10 is a flowchart for illustrating another exemplary process associated with the method for processing information in the information processing apparatus according to the present embodiment.

FIG. 10 is a flowchart for illustrating another exemplary process associated with the method for processing information in the information processing apparatus 100 according to the present embodiment, which illustrates an exemplary process in the case where the information processing apparatus 100 performs the first exception handling described in (a) above. In a similar manner to FIG. 9, FIG. 10 illustrates a process associated with the interrupt detection in the process of the information processing apparatus 100 in FIG. 8, in other words, a part of the process of the information processing apparatus 100 in FIG. 8. More specifically, a process in steps S300 to S304 illustrated in FIG. 10 corresponds to the process at the time when the process 1 is performed between the information processing apparatus 100 and the server 200 in FIG. 8. The processing in step S306 and the processing in step S308 illustrated in FIG. 10 correspond to the process performed between the process 1 and the process 2 in FIG. 8. Further, a process in steps S310 to S316 illustrated in FIG. 10 corresponds to the process at the time when the process 2 is performed between the information processing apparatus 100 and the server 200 in FIG. 8.

In a similar manner to step S200 illustrated in FIG. 9, the information processing apparatus 100 determines whether or not a start command of interrupt detection is detected (S300). In a case where it is not determined in step S300 that the start command is detected, the information processing apparatus 100 does not proceed with the process associated with the interrupt detection until it is determined that the start command is detected.

In a case where it is determined in step S300 that the start command is detected, in a similar manner to step S202 illustrated in FIG. 9, the information processing apparatus 100 updates the interrupt detection flag to a value indicating OFF (S302). Then, the information processing apparatus 100 starts a detection process (S304).

When the detection process starts, in a similar manner to step S206 illustrated in FIG. 9, the information processing apparatus 100 determines whether or not the interrupt process is detected (S306).

In a case where it is determined in step S306 that the interrupt process is detected, in a similar manner to step S208 illustrated in FIG. 9, the information processing apparatus 100 updates the interrupt detection flag to a value indicating ON (S308).

Furthermore, in a case where it is not determined in step S306 that the interrupt process is detected, in a similar manner to the process illustrated in FIG. 9, the information processing apparatus 100 does not update the interrupt detection flag.

When a process 2 command is obtained, in a similar manner to step S210 illustrated in FIG. 9, the information processing apparatus 100 determines whether or not the interrupt detection flag is ON before execution of the process 2 corresponding to the process 2 command (S310).

In a case where it is determined in step S310 that the interrupt detection flag is ON, the information processing apparatus 100 determines whether or not the process 2 corresponding to the process 2 command is a process involving data change (S312). The information processing apparatus 100 determines whether or not the process 2 is a process involving data change by, for example, referring to a table (or database) in which the process involving data change is registered, searching the command included in the process 2 for a command corresponding to the process involving data change, or the like.

In a case where it is not determined in step S312 that the process 2 is a process involving data change, the information processing apparatus 100 performs processing in step S316 to be described later.

Furthermore, in a case where it is determined in step S312 that the process 2 is a process involving data change, in a similar manner to step S212 illustrated in FIG. 9, the information processing apparatus 100 sets the process 2 corresponding to the process 2 command as an error, and does not execute the process 2 (S314).

In a case where it is not determined in step S310 that the interrupt detection flag is ON, or in a case where it is not determined in step S312 that the process 2 is a process involving data change, in a similar manner to step S214 illustrated in FIG. 9, the information processing apparatus 100 executes the process 2 corresponding to the process 2 command, and normally terminates the process 2 (S316).

The information processing apparatus 100 can perform, for example, the process illustrated in FIG. 10 as a process associated with the interrupt detection in the process of the information processing apparatus 100 in FIG. 8.

For example, even in a case where the process illustrated in FIG. 10 is performed, in a similar manner to the case where the process illustrated in FIG. 9 is performed, the contents of the process 2 change depending on the presence or absence of the interrupt process from the process 1 to the process 2, whereby consistency between the process 1 and the process 2 can be maintained.

[2-4] Use Case to which the Method for Processing Information According to the Present Embodiment is Applied Next, an exemplary use case to which the method for processing information according to the present embodiment is applied will be described. Note that it goes without saying that the use case to which the method for processing information according to the present embodiment is not limited to the example to be described below.

(i) First Exemplary Use Case

The method for processing information according to the present embodiment can be applied to, for example, charging of an electronic value as illustrated in FIG. 7. In a first exemplary use case, a readout process corresponds to the process 1 illustrated in FIGS. 8 to 10, and a writing process corresponds to the process 2 illustrated in FIGS. 8 to 10.

As described with reference to FIGS. 8 to 10, for example, the information processing apparatus 100 changes contents of the writing process depending on the presence or absence of an interrupt process from the readout process to the writing process. Therefore, according to the first exemplary use case, consistency between the readout process and the writing process is maintained, and a situation as illustrated in FIG. 7 where "inconsistency occurs between a value of the electronic value specified by a charge request and a value of the electronic value to be actually charged" is suppressed.

(ii) Second Exemplary Use Case

The method for processing information according to the present embodiment can be applied to "various kinds of migration of data, such as balance data and transportation ticket data, from one terminal (example of the information processing apparatus 100; same applies hereinafter) to another terminal (example of the information processing apparatus 100; same applies hereinafter)". In a second exemplary use case, the process 1 illustrated in FIGS. 8 to 10 corresponds to a readout process for reading out data from one terminal, and the process 2 illustrated in FIGS. 8 to 10 corresponds to a data deletion process.

The second exemplary use case will be described with reference to FIG. 8. On the basis of a readout command transmitted from the server 200, one terminal reads out application data corresponding to the readout command, and transmits the read data to the server 200 (corresponding to steps S102 and S106 in FIG. 8). Furthermore, the terminal starts an interrupt detection process on the basis of an interrupt detection start command transmitted from the server 200 (corresponding to step S104 in FIG. 8).

The server 200 confirms the data transmitted from the terminal, and confirms that the data can be deleted. Furthermore, the server 200 records the data (e.g., balance data, transportation ticket data, etc.) transmitted from the terminal in a recording medium.

When it is confirmed that the data can be deleted, the server 200 transmits a data deletion command (corresponding to step S110 in FIG. 8).

The terminal performs the data deletion process corresponding to the data deletion command transmitted from the server 200 on the basis of an interrupt detection state (corresponding to step S112 in FIG. 8). For example, in a case where the interrupt detection state is a state in which an interrupt is detected, the terminal sets the data deletion process as an error, and does not delete the data. Furthermore, in a case where the interrupt detection state is a state in which no interrupt is detected, the terminal performs the data deletion process to delete data.

Here, in a case where the process associated with the method for processing information according to the present embodiment is not performed when an interrupt process similar to step S76 in FIG. 7 occurs from the readout process to the data deletion process, for example, a situation where "inconsistency occurs between balance data recorded by the server 200 and balance data stored in the terminal" can occur.

However, as described with reference to FIGS. 8 to 10, for example, the information processing apparatus 100 changes contents of the writing process depending on the presence or absence of the interrupt process from the readout process (corresponding to the process 1 illustrated in FIGS. 8 to 10) to the data deletion process (corresponding to the process 2 illustrated in FIGS. 8 to 10). Therefore, according to the second exemplary use case, the consistency between the readout process and the data deletion process is maintained, and the situation as described above where "inconsistency occurs between the balance data recorded by the server 200 and the balance data stored in the terminal" is suppressed.

[2-5] Effects Exerted by Using the Method for Processing Information According to the Present Embodiment With the method for processing information according to the present embodiment being used, the following effects are exerted in the information processing system according to the present embodiment, for example. Note that it goes without saying that the effects exerted by the method for processing information according to the present embodiment being used are not limited to the examples to be described below.

Even in a case where a relay component is present, the relay component does not need to maintain a session. In a case where a relay component is a relay server, the relay server can take a stateless configuration.

Since a relay component does not need to maintain a session, an "effect of increasing the number of clients that can perform a process at a time" is exerted in a relay server (exemplary relay component). Furthermore, since the relay server does not need to maintain the session, an "effect that scalability of the relay server can be improved" is exerted, such as increasing the number of relay servers depending on the number of connections, and decreasing the number of relay servers depending on the number of connections.

Since a relay component does not need to maintain a session, software (exemplary relay component) such as an application and a driver does not need to manage the session. Therefore, implementation (programming) of the software, such as an application and a driver, can be simplified.

(Program According to the Present Embodiment)

[I] Program for Functioning as a First Information Processing Apparatus

A program for causing a computer system to function as a first information processing apparatus according to the present embodiment (e.g., program capable of executing a process associated with the method for processing information in the information processing apparatus 100 included in the information processing system 1000) is executed by a processor or the like in the computer system, thereby implementing an information processing system capable of performing a series of processes between devices without maintaining a session. Here, examples of the computer system according to the present embodiment include a single computer and a plurality of computers. The computer system according to the present embodiment performs a series of processes associated with the method for processing information in the first information processing apparatus.

Furthermore, the program for causing the computer system to function as a first information processing apparatus according to the present embodiment is executed by a processor or the like in the computer system, whereby the effects to be exerted by the process associated with the method for processing information in the information processing apparatus 100 (first information processing apparatus) mentioned above can be exerted.

[II] Program for Functioning as a Second Information Processing Apparatus

A program for causing a computer system to function as a second information processing apparatus according to the present embodiment (e.g., program capable of executing a process associated with the method for processing information in the server 200 included in the information processing system 1000) is executed by a processor or the like in the computer system, thereby implementing an information processing system capable of performing a series of processes between devices without maintaining a session.

Furthermore, the program for causing the computer system to function as a second information processing apparatus according to the present embodiment is executed by a processor or the like in the computer system, whereby the effects to be exerted by the process associated with the method for processing information in the server 200 (second information processing apparatus) mentioned above can be exerted.

Although the preferred embodiment of the present disclosure has been described above in detail with reference to the accompanying drawings, the technical scope of the present disclosure is not limited to such examples. It is obvious that those skilled in the art in the technical field of the present disclosure may find various alterations and modifications within the scope of the appended claims, and it should be understood that such alterations and modifications are also naturally within the technical scope of the present disclosure.

For example, although it has been described above that the program for causing the computer system to function as a first information processing apparatus according to the present embodiment or a second information processing apparatus according to the present embodiment is provided, the present embodiment can further provide a recording medium storing each program described above or a recording medium storing both of the programs described above.

The configuration described above is an example of the present embodiment, and naturally belongs to the technical scope of the present disclosure.

Furthermore, the effects described in the present specification are merely illustrative or exemplary, and are not limited. That is, the techniques according to the present disclosure can exert other effects obvious to those skilled in the art from the disclosure of the present specification together with or instead of the effects described above.

Note that the following configurations are also within the technical scope of the present disclosure.

(1)

An information processing apparatus including:

a processing unit that performs a series of processes with an external device; and a detection unit that detects an interrupt of a process other than the series of processes after the series of processes is started, in which the processing unit changes contents of a process to be performed after the interrupt is detected on the basis of a detection state of the interrupt.

(2)

The information processing apparatus according to (1), in which the detection unit updates interrupt detection information indicating the detection state of the interrupt on the basis of a result of the detection of the interrupt, and the processing unit changes the contents of the process to be performed after the interrupt is detected on the basis of the interrupt detection information.

(3)

The information processing apparatus according to (2), in which in a case where the interrupt is detected, the detection unit updates the detection state indicated by the interrupt detection information to a state in which the interrupt is detected.

(4)

The information processing apparatus according to (2) or (3), in which when the detection of the interrupt is started, the detection unit initializes the detection state indicated by the interrupt detection information to a state in which the interrupt is not detected.

(5)

The information processing apparatus according to any one of (1) to (4), in which the detection unit starts the detection of the interrupt on the basis of a start command for starting interrupt detection transmitted from the external device.

(6)

The information processing apparatus according to any one of (1) to (5), in which in a case where the detection state of the interrupt is a state in which the interrupt is detected, the processing unit does not perform the process to be performed after the interrupt is detected.

(7)

The information processing apparatus according to (6), in which in a case where the process to be performed after the interrupt is detected is a set predetermined process, the processing unit performs the process to be performed after the interrupt is detected regardless of the detection state of the interrupt.

(8)

The information processing apparatus according to (7), in which the predetermined process is a process not involving information change due to the process being performed.

(9)

The information processing apparatus according to any one of (1) to (8), in which the processing unit further changes the contents of the process to be performed after the interrupt is detected on the basis of a confirmation command indicating whether or not to confirm the detection state of the interrupt transmitted from the external device.

(10)

The information processing apparatus according to (9), in which the processing unit is configured to:

change the contents of the process to be performed after the interrupt is detected on the basis of the detection state of the interrupt in a case where the obtained confirmation command indicates that the detection state of the interrupt is to be confirmed, and not to change the contents of the process to be performed after the interrupt is detected regardless of the detection state of the interrupt in a case where the obtained confirmation command indicates that the detection state of the interrupt is not to be confirmed.

(11)

An information processing apparatus including a processing unit that performs a series of processes with an external device, in which the processing unit causes a start command for starting detection of an interrupt of a process other than the series of processes after the series of processes is started to be transmitted to the external device.

(12)

The information processing apparatus according to (11), in which the processing unit causes a confirmation command indicating whether or not to confirm a detection state of the interrupt to be transmitted to the external device after the series of processes is started.

(13)

A method for processing information to be executed by an information processing apparatus, the method including:

a step of performing a series of processes with an external device; and a step of detecting an interrupt of a process other than the series of processes with respect to the series of processes that has been started, in which in the step of performing the series of processes, contents of a process to be performed after the interrupt is detected are changed on the basis of a detection state of the interrupt.

REFERENCE SIGNS LIST

10, 100 Information processing apparatus
20, 200 Server
102 First communication unit
104 Second communication unit
106, 204 Controller
110, 210 Processing unit
112 Detection unit
202 Communication unit 300 Network
400 Reader/writer
1000 Information processing system

The invention claimed is:

1. An information processing apparatus comprising:
a device host (DH) comprising a first processor;
a universal integrated circuit card (UICC);
a contactless front end (CLF) comprising an antenna; and
a controller comprising a different second processor and a detection unit,
wherein the UICC is configured to
via the DH, initiate execution of a plurality of processes with a server separate from the information processing apparatus, the plurality of processes executed in series,
communicate with the DH using a first communication path and a first communication protocol, and
communicate with the CLF using a different second communication path and a different second communication protocol,
wherein the controller is configured to
detect an interrupt of a process other than the plurality of processes after the performance of the plurality of processes is initiated, and
determine whether to change contents of a subsequent process to be included in the plurality of processes to be executed after the interrupt is detected, wherein the determination is based on a detection state of the interrupt and a type of the subsequent process to be executed after the interrupt is detected,
wherein the CLF is configured to receive the process other than the plurality of processes from an external device separate from the information processing apparatus and the server, and
wherein the UICC is further configured to execute, via the DH, the subsequent process with the server regardless of the detection state of the interrupt when the type of the subsequent process indicates a set predetermined process.

2. The information processing apparatus according to claim 1,
wherein the information processing apparatus further comprises circuitry configured to
update interrupt detection information indicating the detection state of the interrupt based on a result of the detection of the interrupt, and
change the contents of the subsequent process in the plurality of processes to be executed after the interrupt is detected based on the interrupt detection information.

3. The information processing apparatus according to claim 2, wherein in a case where the interrupt is detected, the circuitry is further configured to update the detection state indicated by the interrupt detection information to a state in which the interrupt is detected.

4. The information processing apparatus according to claim 2, wherein when the detection of the interrupt is started, the circuitry is further configured to initialize the detection state indicated by the interrupt detection information to a state in which the interrupt is not detected.

5. The information processing apparatus according to claim 1, wherein the controller is further configured to start the detection of the interrupt based on a start command for starting interrupt detection transmitted from the external device.

6. The information processing apparatus according to claim 1, wherein in a case where the detection state of the interrupt is a state in which the interrupt is detected, and the type of the subsequent process does not indicate the predetermined process, the controller is further configured to change the contents and the UICC is further configured to not execute the process after the interrupt is detected.

7. The information processing apparatus according to claim 1, wherein the information processing apparatus further comprises circuitry configured to change the contents of the subsequent process in the plurality of processes to be executed after the interrupt is detected based on a confirmation command indicating whether or not to confirm the detection state of the interrupt transmitted from the external device.

8. The information processing apparatus according to claim 7, wherein the circuitry is further configured to change the contents of the subsequent process in the plurality of processes to be executed after the interrupt is detected based on the detection state of the interrupt in a case where the obtained confirmation command indicates that the detection state of the interrupt is to be confirmed, and not to change the contents of the subsequent process in the plurality of processes to be executed after the interrupt is detected regardless of the detection state of the interrupt in a case where the obtained confirmation command indicates that the detection state of the interrupt is not to be confirmed.

9. The information processing apparatus according to claim 1, wherein the type of the subsequent process is determined by referring to a database in which a plurality of processes are registered.

10. The information processing apparatus according to claim 1, wherein the CLF is configured to receive the process other than the plurality of processes from the external device via near field communication (NFC).

11. The information processing apparatus according to claim 1, wherein the first communication protocol includes ISO7816.

12. The information processing apparatus according to claim 1, wherein the second communication protocol includes a host controller interface (HCI) protocol, a single wire protocol (SWP), or a dual wire protocol (DWP).

13. The information processing apparatus according to claim 1, wherein the information processing apparatus further includes circuitry comprising a micro processing unit (MPU).

14. The information processing apparatus according to claim 1, wherein the information processing apparatus further includes a non-transitory storage and a display.

15. The information processing apparatus according to claim 1, wherein the DH and CLF are further configured to communicate with each other via a host controller interface (HCI) protocol or a near field communication controller interface (NCI) protocol.

16. The information processing apparatus according to claim 1, wherein the DH further comprises a communication antenna, a radio frequency (RF) circuit, at least one port, a wireless communication circuit, and a wired communication circuit.

17. The information processing apparatus according to claim 1, wherein the information processing apparatus communicates with the server via a wired or wireless network.

* * * * *